(12) United States Patent
Muraoka

(10) Patent No.: US 6,845,688 B2
(45) Date of Patent: Jan. 25, 2005

(54) BICYCLE PEDAL ASSEMBLY

(75) Inventor: Tsutomu Muraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/237,171

(22) Filed: Sep. 9, 2002

(65) Prior Publication Data
US 2003/0051576 A1 Mar. 20, 2003

Related U.S. Application Data

(63) Continuation-in-part of application No. 10/083,532, filed on Feb. 27, 2002, now Pat. No. 6,722,229, which is a continuation-in-part of application No. 09/954,435, filed on Sep. 18, 2001, now Pat. No. 6,708,584.

(51) Int. Cl.[7] .............................. G05G 1/14; A43B 5/00
(52) U.S. Cl. ...................... 74/594.6; 36/131; 74/594.4
(58) Field of Search ............................ 74/594.4, 594.6; 36/131, 132, 117, 120, 122

(56) References Cited

U.S. PATENT DOCUMENTS

| | | | |
|---|---|---|---|
| 4,506,463 A | | 3/1985 | Chassaing |
| 4,686,867 A | * | 8/1987 | Bernard et al. ............ 74/594.6 |
| 4,739,564 A | | 4/1988 | Eser |
| 4,762,019 A | | 8/1988 | Beyl |
| 4,827,797 A | | 5/1989 | Le Faou et al. |
| 4,840,086 A | * | 6/1989 | Bidal ......................... 74/594.6 |
| 4,882,946 A | | 11/1989 | Beyl |
| 5,131,291 A | | 7/1992 | Beyl |
| 5,142,938 A | | 9/1992 | Sampson |
| 5,203,229 A | | 4/1993 | Chen |
| 5,377,561 A | | 1/1995 | Danieli et al. |
| 5,417,128 A | | 5/1995 | Beyl |
| 5,423,233 A | | 6/1995 | Peyre et al. |
| 5,505,111 A | | 4/1996 | Nagano |
| 5,557,985 A | | 9/1996 | Nagano |
| 5,697,262 A | | 12/1997 | Chen |
| 5,727,429 A | | 3/1998 | Ueda |
| 5,755,144 A | | 5/1998 | Ueda |
| 5,765,450 A | | 6/1998 | Kruger et al. |
| 5,931,053 A | | 8/1999 | Chen |
| 5,992,266 A | | 11/1999 | Heim |
| 6,112,620 A | | 9/2000 | Chen |
| 6,119,551 A | | 9/2000 | Ueda |
| 6,170,357 B1 | | 1/2001 | Chen |
| 6,244,136 B1 | | 6/2001 | Chen |
| 6,293,169 B1 | | 9/2001 | Takahama |
| 6,305,244 B1 | | 10/2001 | Takahama |
| 6,405,614 B1 | | 6/2002 | Beyl |
| 2003/0051575 A1 | | 3/2003 | Muraoka |

FOREIGN PATENT DOCUMENTS

| | | |
|---|---|---|
| EP | 0 542 238 B1 | 4/1995 |
| FR | 2 809 701 A1 | 12/2001 |
| WO | WO 99/14107 A1 | 6/2002 |

* cited by examiner

*Primary Examiner*—Chong H. Kim
(74) *Attorney, Agent, or Firm*—Shinjyu Global IP Counselors, LLP

(57) ABSTRACT

A bicycle pedal assembly includes a pedal and a cleat. The pedal includes a pedal body that rotates about a shaft and front and rear clamping members coupled to opposite ends of the pedal body. The cleat has front and rear attachment portions that are selectively engageable with the pedal via the front and rear clamping members. The pedal and the cleat are configured to form a laterally shiftable floating pivot axis such that the bicycle shoe cleat pivots and laterally shifts about the floating pivot axis relative to the pedal body through predetermined ranges of pivotal and lateral movements without releasing the bicycle shoe cleat from the bicycle pedal.

21 Claims, 21 Drawing Sheets

BICYCLE PEDAL ASSEMBLY

CROSS-REFERENCE TO RELATED APPLICATIONS

This application is a continuation-in-part application of U.S. patent application Ser. No. 10/083,532 filed on Feb. 27, 2002, now U.S. Pat. No. 6,722,229, which in turn is a continuation-in-part application of U.S. patent application Ser. No. 09/954,435 filed on Sep. 18, 2001, now U.S. Pat. No. 6,708,584. The entire disclosures of U.S. patent application Ser. Nos. 09/954,435 and 10/083,532 are hereby incorporated herein by reference.

BACKGROUND OF THE INVENTION

1. Field of the Invention

This invention generally relates to a bicycle pedal assembly. More specifically, the present invention relates clipless or step-in bicycle pedal assembly, which has a pedal and a cleat configure for a predetermined ranging of floating movement of the cleat relative to the pedal.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. A road-racing pedal, on the other hand, typically only has a cleat engagement mechanism on one side of the pedal body. In either case, in these types of bicycle pedals, the rider steps onto the pedal and the cleat engagement mechanism automatically grips on to the cleat secured to the bottom of the cyclist's shoe.

With this type of step-in or clipless pedal, the shoe and the pedal are in a state of constant engagement when the cleat is engaged in the cleat clamping members, so the pedaling force can be transmitted efficiently to the pedals. As a result, step-in or clipless pedals are widely employed on racing bicycles used in road racing and mountain bike racing.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

Typically, these step-in or clipless pedals and the cleats for these pedals are designed to allow a limited amount of play or float between the pedal and the cleat (while engaged), but prior to disengagement. When releasing the shoe from the pedal, the cyclist will typically turn the shoe about a forward pivot axis that is perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe. It is important that the cleat does not inadvertently release the pedal during normal pedaling.

Some of these prior step-in or clipless pedals can inadvertently release the cleat during normal pedaling if the spring force on the rear clamping member is set too low. However, if the spring force on the rear clamping member is set too high, the cleat may not release from the pedal properly. This could result in the rider's shoe not properly releasing from the pedal at the desired application of force because the rider's shoe either releases too easily from the pedal or does not release at the proper time.

Many of these prior step-in or clipless pedals can be complicated and expensive to manufacture and assemble. Additionally, these step-in or clipless pedals can become clogged with mud and or debris making engagement/disengagement difficult. Moreover, some of these step-in or clipless pedals sometimes do not transfer power to the bicycle crank arms in the most efficient manner. Finally, these step-in or clipless pedals can be uncomfortable and cause fatigue to the rider's foot after extended riding periods.

In view of the above, there exists a need for an improved bicycle pedal assembly that takes into account at least some of the above mentioned problems in the prior art. This invention addresses this need in the prior art as well as other needs, which will become apparent to those skilled in the art from this disclosure.

SUMMARY OF THE INVENTION

One object of the present invention is to provide a step-in bicycle pedal assembly that has a laterally shiftable floating pivot axis.

Another object of the present invention is to provide a step-in bicycle pedal assembly that is relatively malfunction free.

Still another object of the present invention is to provide a step-in bicycle pedal assembly that is configured and arranged to avoid inadvertently release of the cleat from the pedal during normal pedaling.

Yet another object of the present invention is to provide a step-in bicycle pedal assembly that is relatively simple and inexpensive to manufacture.

The foregoing objects can basically be achieved by providing a bicycle pedal assembly comprising a bicycle pedal and a bicycle cleat. The bicycle pedal includes a pedal shaft, a pedal body, a front clamping member and a rear clamping member. The pedal shaft has a first end adapted to be coupled to a bicycle crank and a second end with a center rotation axis extending between the first and second ends. The pedal body is rotatably coupled to the second end of the pedal shaft about the center rotation axis of the pedal shaft. The pedal body has a front end and a rear end longitudinally spaced from the front end. The front clamping member is coupled to the front end of said pedal body. The rear clamping member is movably coupled to the rear end of the pedal body to move rearwardly between a clamping position and a release position. The bicycle shoe cleat is selectively engageable with the pedal body via the front and rear clamping members and includes a front attachment portion, a rear attachment portion and a connecting portion. The front attachment portion is configured to selectively engage the front clamping member. The rear attachment portion is configured to selectively engage the rear clamping member. The connecting portion connecting portion extends between the front and rear attachment portions. The front and rear clamping members and the front and rear attachment portions are configured relative to one another to form a laterally shiftable floating pivot axis that is substantially perpendicular to the center rotation axis when the front and rear clamping members are engaged with the front and rear attachment portions, respectively, such that the bicycle shoe cleat pivots and laterally shifts about the floating pivot axis relative to the pedal body through predetermined ranges of pivotal and lateral movements without releasing the bicycle shoe cleat from the bicycle pedal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
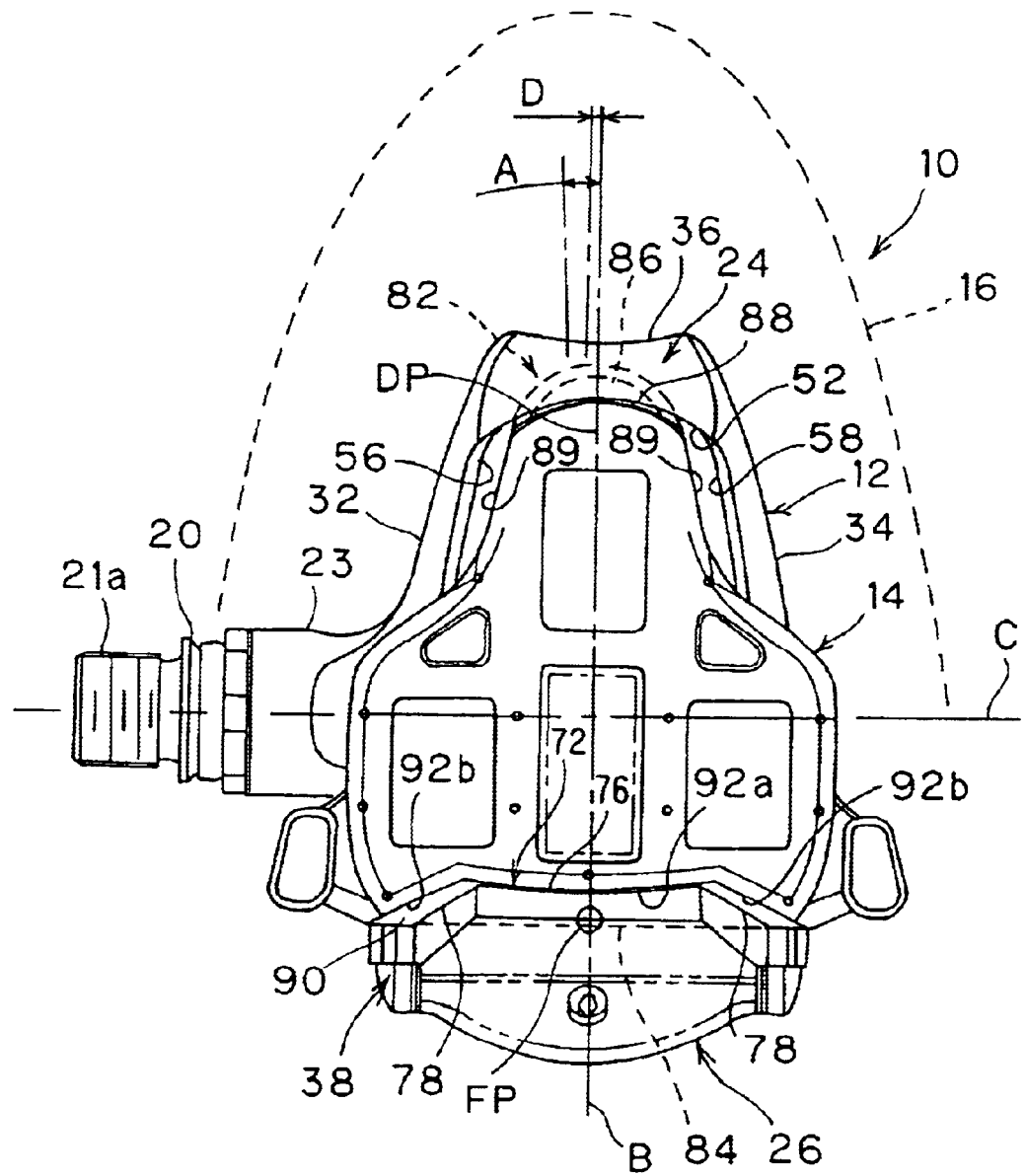
FIG. 1 is a top plan view of the bicycle pedal with a first cleat coupled to a bicycle pedal in a center position, i.e., prior to angulation or lateral movement, in accordance with a preferred embodiment of the present invention.
Figure 2:
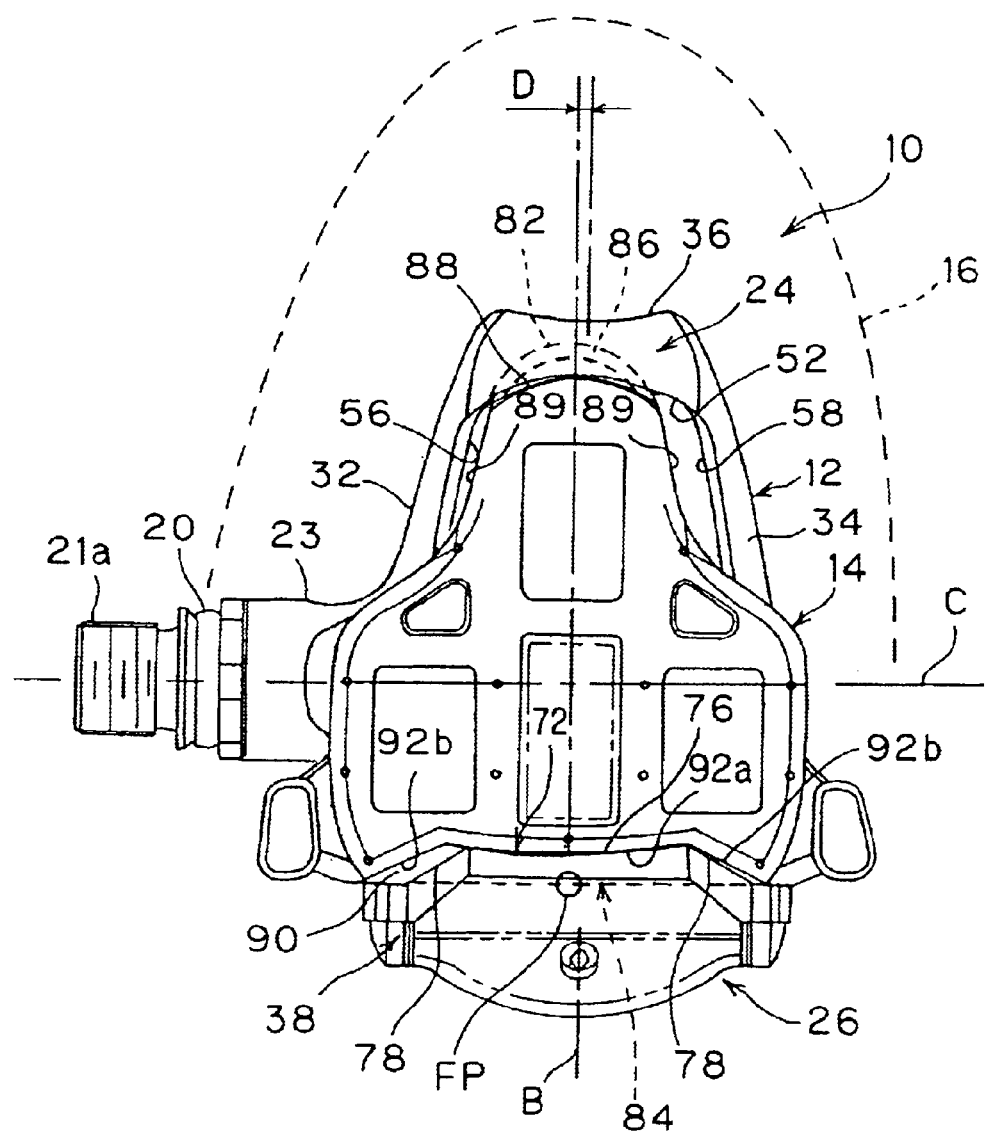
FIG. 2 is a top plan view of the bicycle pedal assembly illustrated in FIG. 1, with the first cleat coupled to the pedal in a laterally shifted position, i.e., after lateral movement to the left from the center position of FIG. 1.
Figure 3:
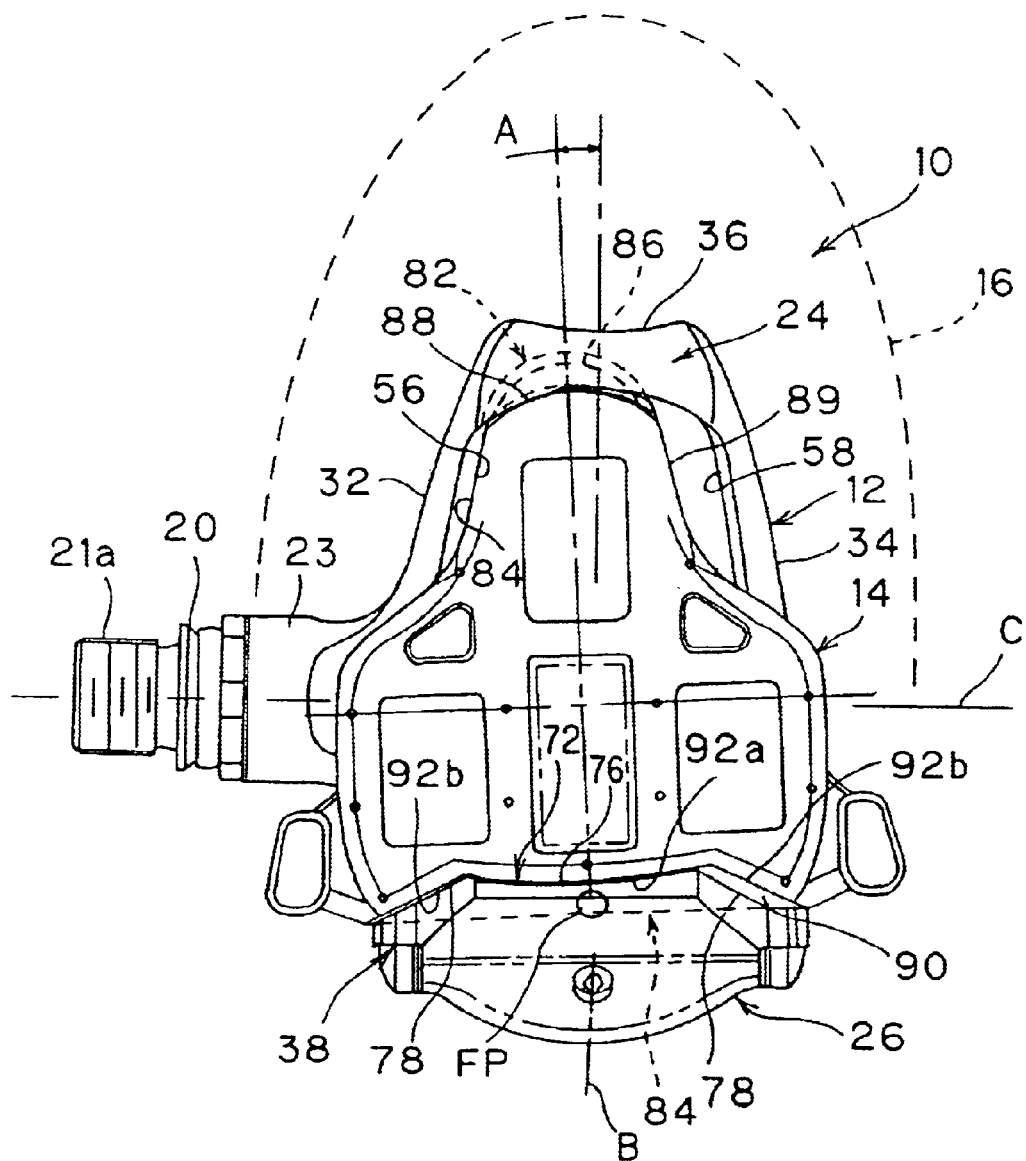
FIG. 3 is a top plan view of the bicycle pedal assembly illustrated in FIGS. 1 and 2, with the first cleat coupled to the pedal in a pivoted or angulated position, i.e., after angulation to the left from the center position of FIG. 1.
Figure 4:
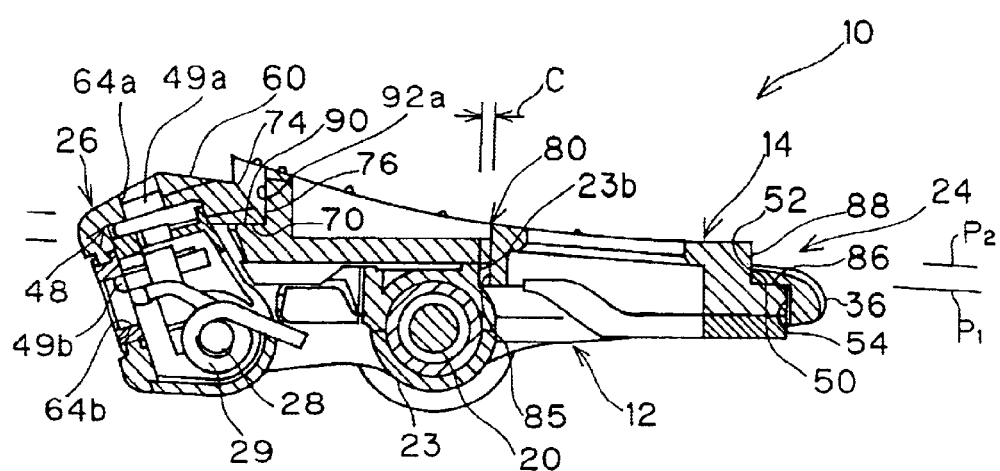
FIG. 4 is a longitudinal cross-sectional view of the bicycle pedal assembly, i.e., the bicycle pedal assembly illustrated in FIGS. 1–3.
Figure 5:
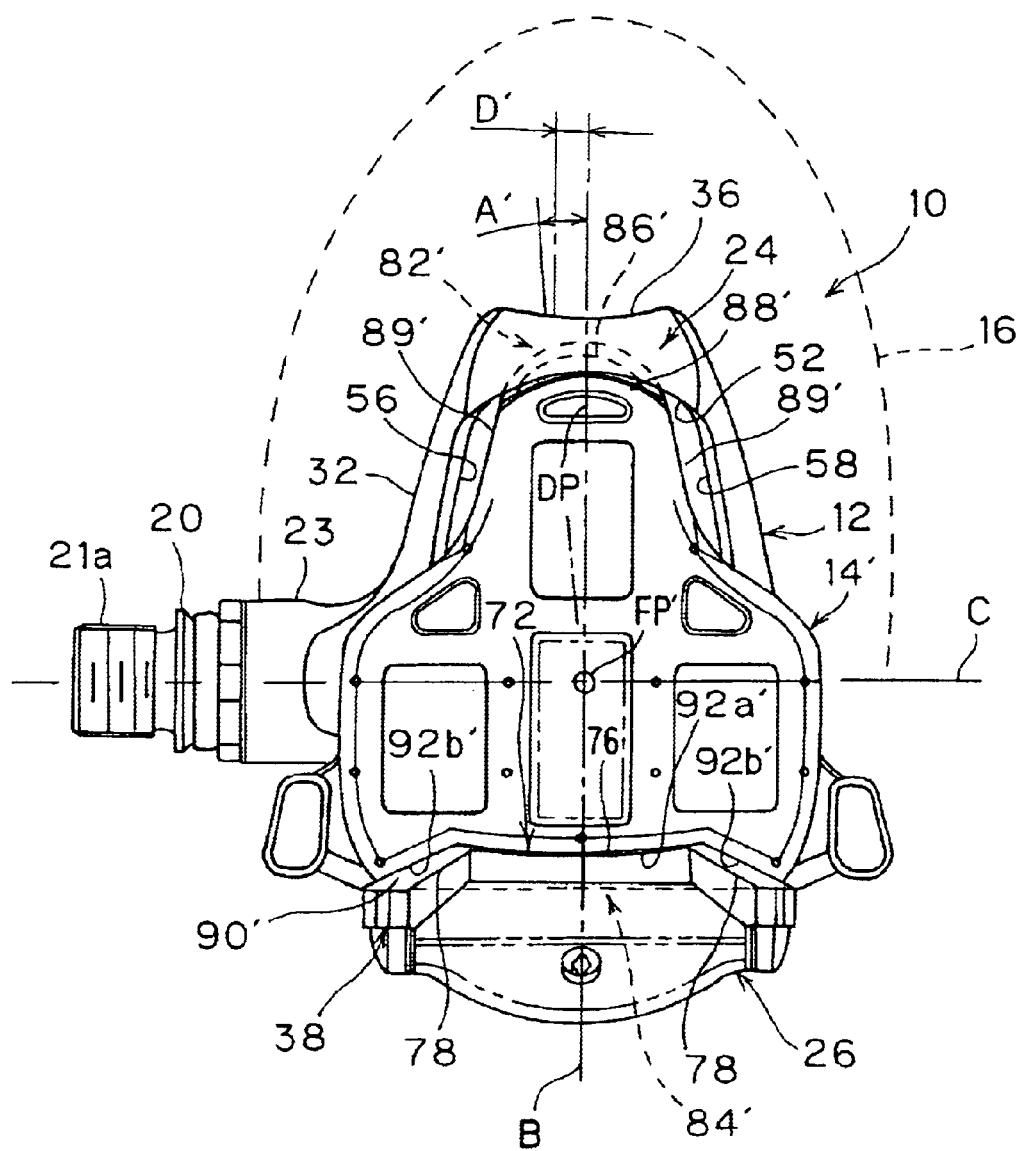
FIG. 5 is a top plan view of a bicycle pedal assembly illustrated in which a second cleat is coupled to the bicycle pedal illustrated in FIGS. 1–4 in a center position, i.e., prior to angulation or lateral movement.
Figure 6:
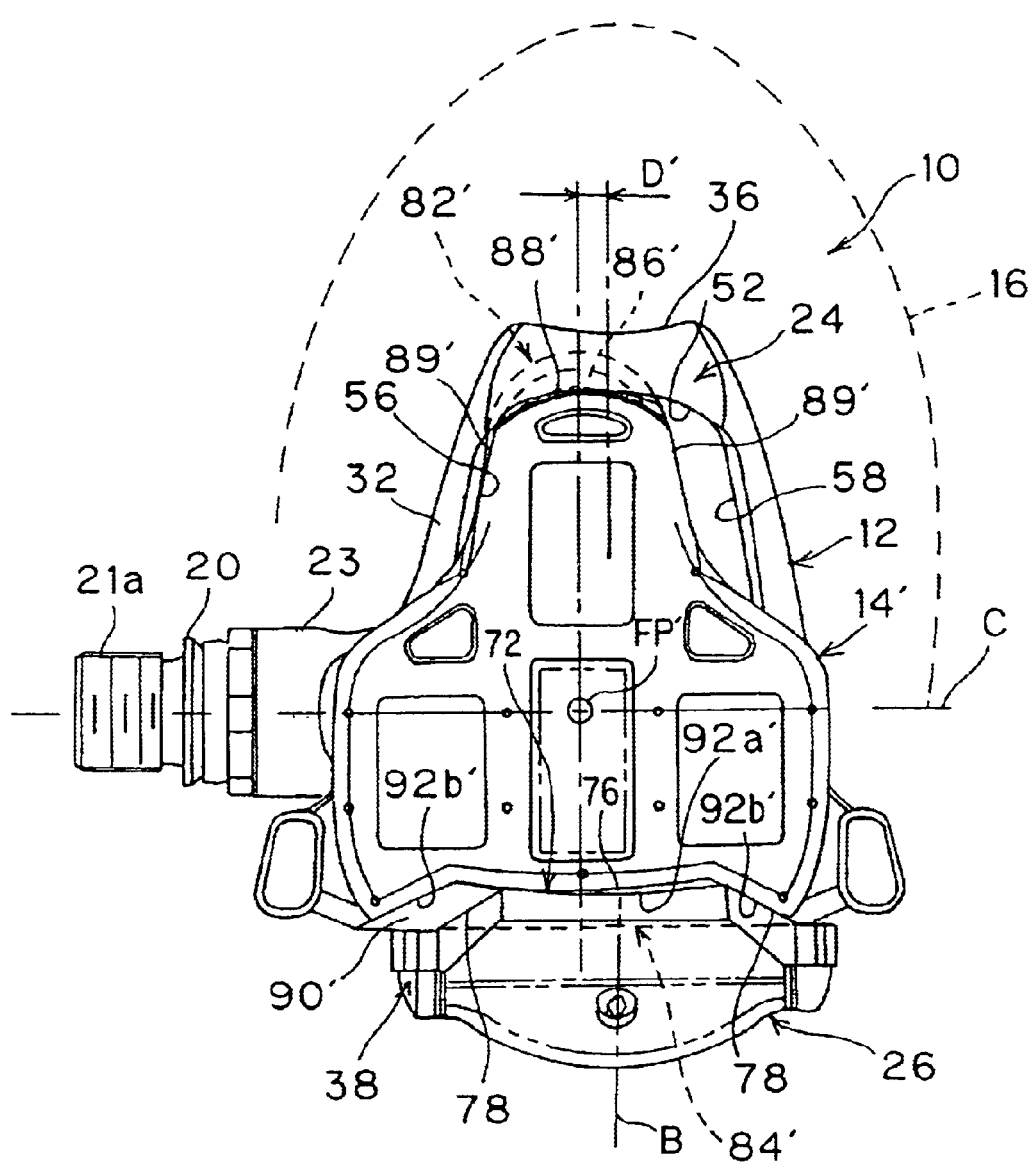
FIG. 6 is a top plan view of the bicycle pedal assembly illustrated in FIG. 5, with the second cleat coupled to the pedal in a laterally shifted position, i.e., after lateral movement to the left from the center position of FIG. 5.
Figure 7:
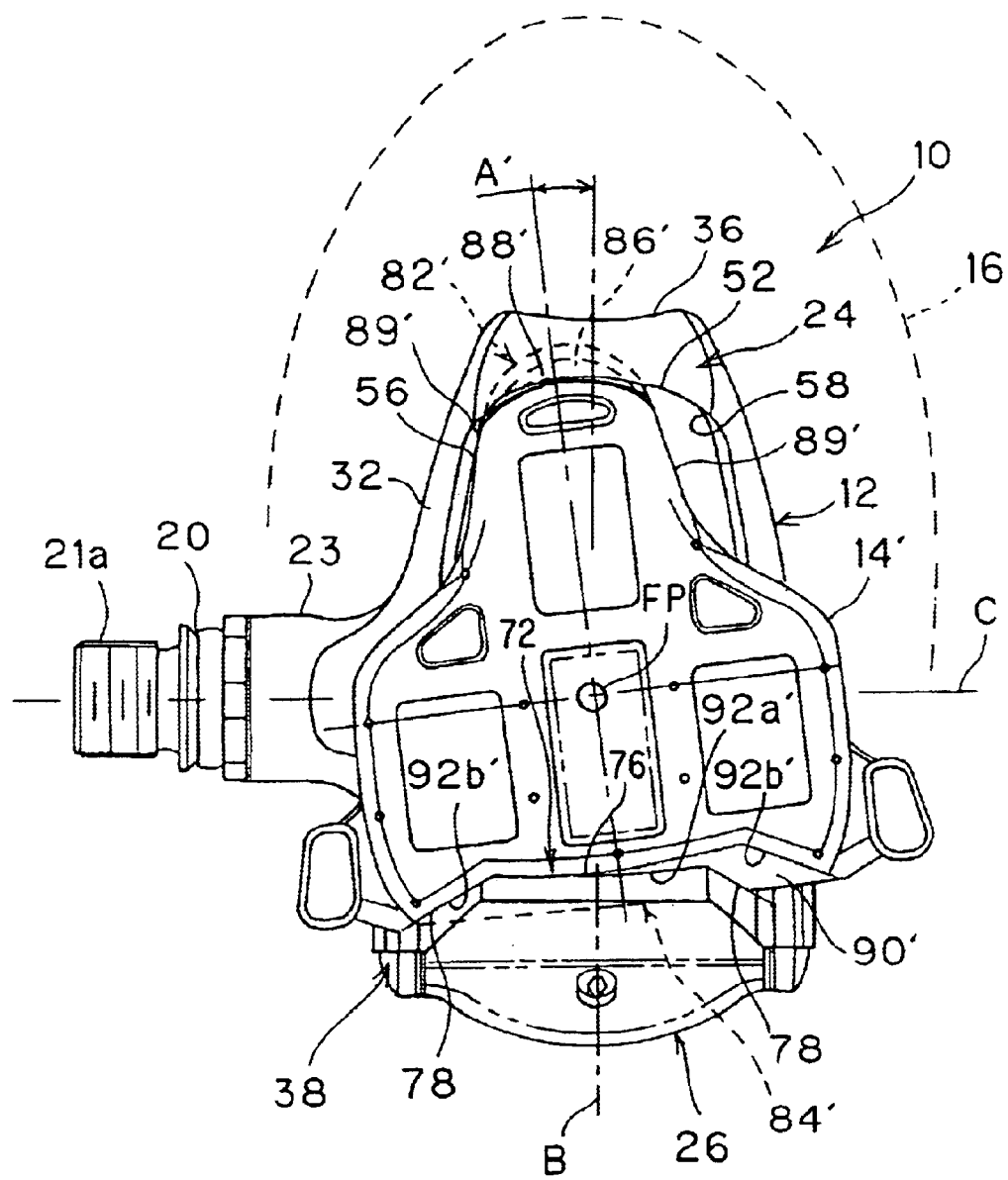
FIG. 7 is a top plan view of the bicycle pedal assembly illustrated in FIGS. 5 and 6, with the second cleat coupled to the pedal in a pivoted or angulated position, i.e., after angulation to the left from the center position of FIG. 5.

Referring initially to FIGS. 1–7, a bicycle pedal assembly 10 is illustrated that includes a bicycle pedal 12, a first cleat 14 and a second cleat 14' in accordance with the first embodiment of the present invention. The bicycle pedal assembly 10 is a clipless or step-in pedal assembly in which either the first cleat 14 or the second cleat 14' is selectively coupled to the bicycle pedal 12 in a releasable manner. When the first cleat 14 is coupled to the bicycle pedal 12 in the accordance with the first embodiment of the present invention, the bicycle pedal assembly 10 has a rear laterally shiftable floating pivot axis FP as seen in FIGS. 1–3. Alternatively, as seen in FIGS. 5–7, when the second cleat 14' is coupled to the bicycle pedal 12 in the accordance with a second embodiment of the present invention, the bicycle pedal assembly 10 has a center laterally shiftable floating pivot axis FP'.

As explained below, the pedal 12 and the cleats 14 and 14' are configured and arranged to prevent inadvertent release of the cleats 14 and 14' from the pedal 12 due to relative rearward movement of the cleats 14 and 14' relative to the pedal 12. The cleats 14 and 14' are preferably fixedly coupled to a bicycle shoe 16 to releasably couple the cyclist's foot to the bicycle pedal 12.

The cleats 14 and 14' are designed such that the cleats 14 and 14' float both laterally and pivotally relative to the bicycle pedal 12 through predetermined ranges of pivotal and lateral movements without releasing the bicycle shoe cleat 14 or 14' from the bicycle pedal 12. Specifically, when the first cleat 14 is coupled to the bicycle pedal 12, the rear pivot axis FP is laterally shiftable by a distance D in each direction from the center position as seen in FIG. 2. Moreover, when the first cleat 14 is coupled to the bicycle pedal 12, the cleat 14 floats or pivots about the rear pivot axis FP by an angle A in each direction from the center position along longitudinal axis B as seen in FIG. 3. In the illustrated embodiment, the pedal 12 and the cleat 14 are configured such that the cleat 14 floats around the rear float pivot axis FP for about three degrees in each direction as measured from a center longitudinal axis B that passes through the rear float pivot axis FP. Moreover, the pedal 12 and the cleat 14 in the illustrated embodiment are configured such that the rear float pivot axis FP can shift laterally about 1.5 millimeters in either direction (i.e. a total of three millimeters) from the straight (non-floated) orientation.

Similarly, when the second cleat 14' is coupled to the bicycle pedal 12, the center pivot axis FP' is laterally shiftable a distance D' in each direction from the center position as seen in FIG. 6. Moreover, when the second cleat 14' is coupled to the bicycle pedal 12, the cleat 14' floats or pivots about the center pivot axis FP' by an angle A' in each direction from the center position along longitudinal axis B as seen in FIG. 6. Thus, a desired degree or angle of float and lateral shifting can be attained between the pedal 12 and the cleat 14 or 14' without interference from other parts of the pedal 12. In the illustrated embodiment, the pedal 12 and the cleat 14' are configured such that the cleat 14' floats around the center float pivot axis FP' for about five degrees in each direction as measured from a center longitudinal axis B that passes through the center float pivot axis FP'. Moreover, the pedal 12 and the cleat 14' in the illustrated embodiment are configured such that the center float pivot axis FP' can shift laterally about four millimeters in either direction (i.e. a total of eight millimeters) from the straight (non-floated) orientation.

Bicycle Pedal 12

Figure 8:
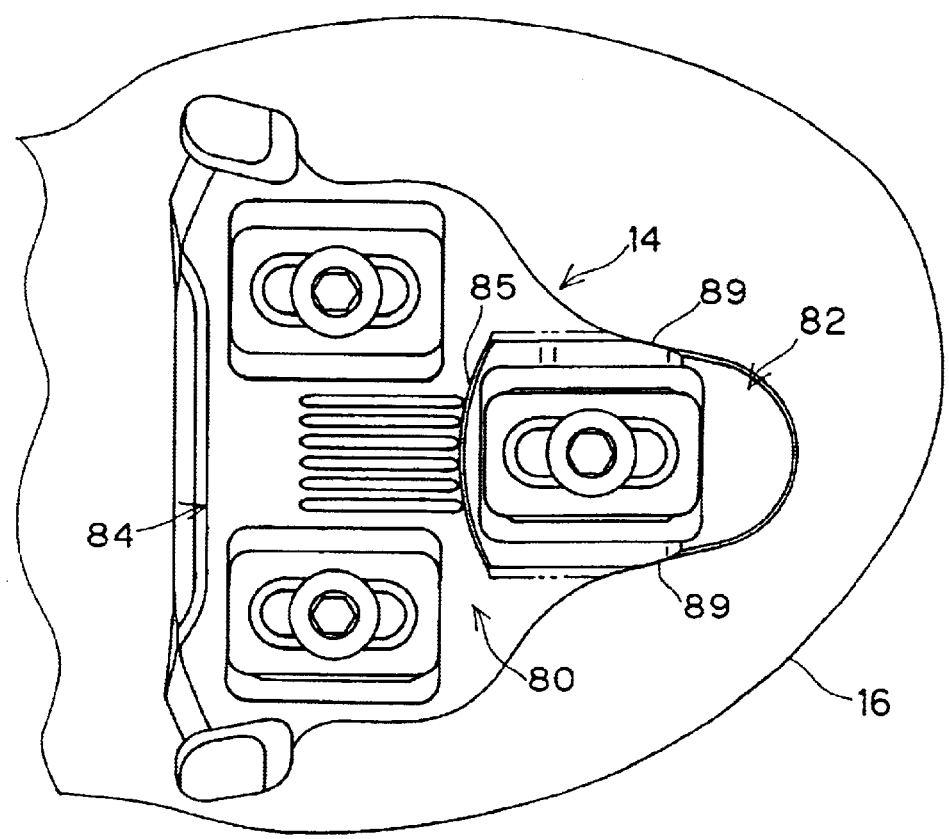
FIG. 8 is a bottom plan view of the first bicycle cleat attached to a sole of a bicycle shoe (shown in broken lines) in accordance with a preferred embodiment of the present invention.
Figure 9:
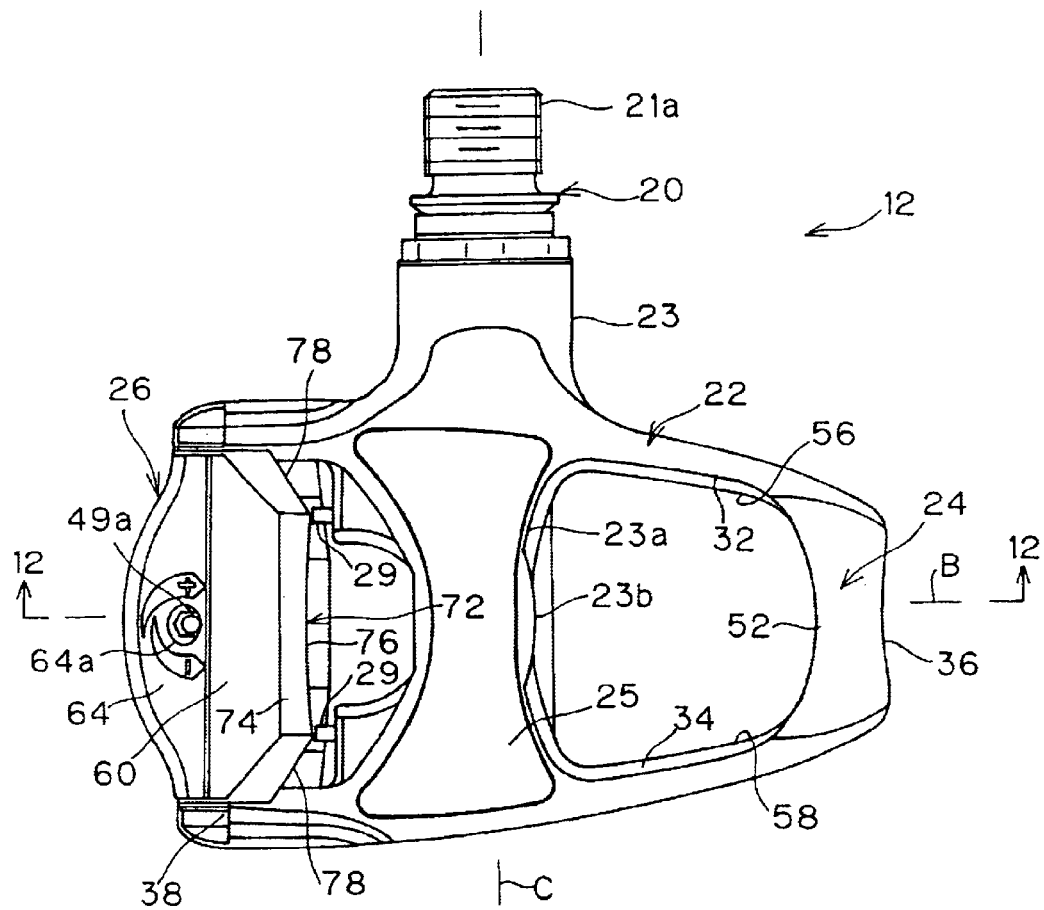
FIG. 9 is a top plan view of the bicycle pedal illustrated in FIGS. 1–7 in accordance with a preferred embodiment of the present invention.
Figure 10:
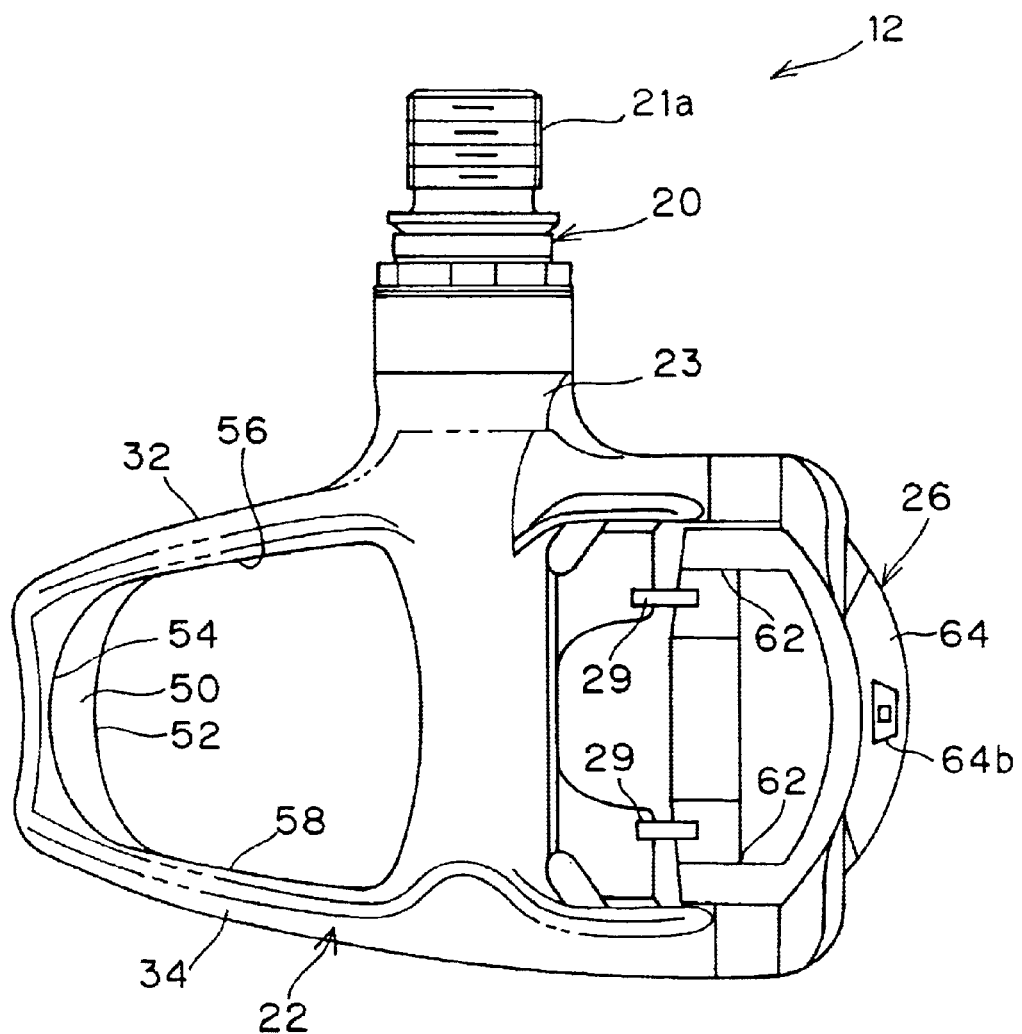
FIG. 10 is a bottom plan view of the bicycle pedal illustrated in FIG. 9.

As seen in FIGS. 1–8 and 9–12, the bicycle pedal 12 basically includes a pedal shaft or spindle 20, a pedal body 22 with a center tubular shaft supporting portion 23, a front (first) clamping member 24 and a rear (second) clamping member 26. As seen in FIG. 9, optionally, a pad 25 overlies a center upper portion of the pedal body 22 along center tubular shaft supporting portion 23. The pad 25 is preferably fixedly secured in recesses formed in the pedal body 22 by a friction fit and/or adhesive. Since the pad 25 is optional, it will not be discussed or illustrated in detail herein. The bicycle pedal assembly 10 is especially designed for use with road bicycles as opposed to use with an off-road bicycle. However, it will be apparent to those skilled in the art from this disclosure that the features of the bicycle pedal assembly 10 can be used in the construction of an off-road type of bicycle pedal assembly if needed and/or desired. In other words, it will be apparent that the present invention can applied to a two-sided pedal. The bicycle pedal 12 is fixedly coupled to a bicycle crank arm of a bicycle (not shown) for rotation therewith. The bicycle pedal 12 illustrated is a right side pedal. Of course, the left side pedal is a mirror image of the right side pedal 12. Thus, it will be apparent to those skilled in the art that the description of the right side pedal 12 also applies to a left side pedal.

The front and rear clamping members 24 and 26 are preferably fixedly coupled to the pedal body 22, with the front clamping member 24 being nonmovably coupled to the pedal body 22 and the rear clamping member 26 being pivotally coupled to the pedal body 22. The front and rear clamping members 24 and 26 define a cleat engagement mechanism that is coupled to an upper surface of the pedal body 22 and arranged to move between a clamping position and a release position.

The shaft 20 is adapted to be coupled to the crank arm of a bicycle, while the pedal body 22 is rotatably coupled to the shaft 20 for supporting a cyclist's foot. Specifically, the pedal shaft 20 has a first end 21a that is fastened to the crank arm and a second end 21b rotatably supported in the tubular shaft supporting portion 23 of the pedal body 22. A center longitudinal pivot axis C extends between the first and second ends 21a and 21b of the pedal shaft 20. The pedal body 22 is freely rotatable about the center longitudinal axis C. A cleat receiving area is formed on one side of the pedal body 22 for receiving and supporting either the cleat 14 or 14' thereon. More specifically, the cleat receiving area is defined as the space located between the front and rear clamping members 24 and 26.

The pedal shaft 20 is preferably a multi-step spindle having several stepped portions that are rotatably coupled within a hollow area of the pedal body 22 in a conventional manner. The first end 21a of the pedal shaft 20 has threads formed thereon for fixedly coupling the pedal 12 to the crank arm in a conventional manner. Preferably, the threads of the left pedal 12 are clockwise threads such that the right pedal 12 remains coupled to crank arm in a conventional manner. Alternatively, the threads of the left pedal shaft (not shown) are preferably counter-clockwise threads such that the left pedal remains coupled to an opposing crank arm (not shown) in a conventional manner. The second end 21b of the pedal shaft 20 rotatably supports the pedal body 22 about the longitudinal pivot axis C by a conventional bearing assembly 27.

Figure 11:
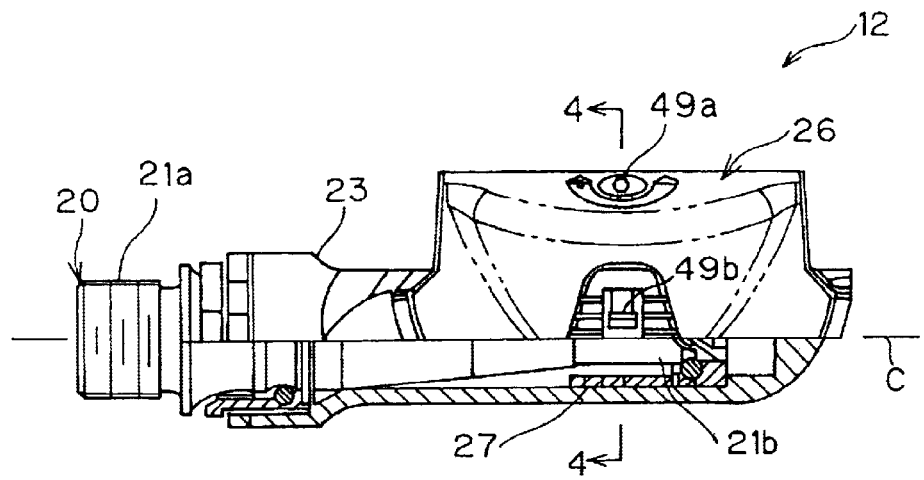
FIG. 11 is a rear end elevational view of the bicycle pedal illustrated in FIGS. 9 and 10 with the bottom portion broken away for purpose of illustration.

In particular, as best seen in FIG. 11, the pedal shaft 20 is secured within the hollow area of the tubular shaft supporting portion 23 of the pedal body 22 by an inner tube and a lock nut in a conventional manner. More specifically, the pedal shaft 20 has the lock nut mounted thereon to secure the bearing assembly 27 and the pedal shaft 20 within the hollow area of the pedal body 22. Since these parts are relatively conventional parts and the specific constructions of these parts are not critical to the present invention, they will not be discussed or illustrated in detail herein. Rather, these parts will only be discussed as necessary to understand the present invention.

The tubular shaft supporting portion 23 of the pedal body 22 has an upper cleat supporting surface 23a and a forwardly facing (first) cleat stop surface 23b. The upper cleat supporting surface 23a lies in a generally flat plane that faces upwardly from the pedal body for supporting the cleat 14. More specifically, the upper cleat supporting surface 23a cooperates with the front and rear clamping members 24 and 26 to limit movement of the cleat 14 in a direction substantially perpendicular to the upper cleat supporting surface 23a. The pad 25 overlies to the upper cleat supporting surface 23a. The cleat stop surface 23b is disposed on a forwardly facing portion of the tubular shaft supporting portion 23 of the pedal body 22. The cleat stop surface 23b is a convexly curved surface that faces towards the front clamping member 24. The curvature of the cleat stop surface 23b is preferably bisected by the longitudinal axis B of the pedal body 22. In other words, the longitudinal axis B of the pedal body 22 bisects the cleat stop surface 23b.

The front clamping member 24 is fixedly coupled to the pedal body 22, while the rear clamping member 26 is pivotally coupled to the pedal body 22. More specifically, the front clamping member 24 is preferably a non-movable member that is integrally formed with the pedal body 22, while the rear clamping member 26 is preferably a separate member mounted on a pivot pin or support pin 28. The pivot pin 28 is coupled to the pedal body 22. Two torsion springs 29 are preferably coupled between the pedal body 22 and the rear clamping member 26. While two springs 29 are preferably mounted on the pivot pin 28, it will be apparent to those skilled in the art from this disclosure that fewer or more springs can be used. Moreover, it will be apparent to those skilled in the art the other types of urging member(s)/ resilient member(s) could be utilized to carry out the present invention. Accordingly, the term "biasing member" as used herein refers to one or more members that applies an urging force between two elements.

As shown in FIGS. 13–20, the pedal body 22 has an inner (first) side portion 32 and an outer (second) side portion 34 with the tubular shaft supporting portion 23 extending transversely therebetween. The tubular shaft supporting portion 23 receives the pedal shaft 20 for rotation about the center longitudinal pivot axis C, while rear ends of the side portions 32 and 34 pivotally support the rear clamping member 26. The side portions 32 and 34 are coupled together at the front of the pedal body 22 (in a substantially U-shape) to form the front clamping member 24 as an integral part of the pedal body 22. The parts of the pedal body 22 are preferably made of a lightweight rigid metallic material such as an aluminum alloy. One of the clamping members 24 and 26 is located at each end of the pedal body 22. In particular, the pedal body 22 is an A-shaped member with a first (front) closed end 36 and a second (rear) open end 38. The front clamping member 24 is coupled at the front end 36, while the rear clamping member 26 is coupled to the rear end 38. The rear clamping member 26 pivotally coupled between the side portions 32 and 34 via the pivot pin 28.

The tubular shaft supporting portion 23 is preferably integrally formed with the first and second side portions 32 and 34 as a one-piece, unitary member. Moreover, the front clamping member 24 is also preferably integrally formed with the pedal body 22. Of course, it will be apparent to those skilled in the art from this disclosure that other constructions could be utilized if needed and/or desired. For example, the pedal body could be formed of several separate pieces removably secured together by a plurality of screws or other conventional fasteners. Furthermore, it will be apparent to those skilled in the art that the front clamping member 24 could be a separate member that is releasably coupled to a one-piece H-shaped pedal body if needed and/or desired. In any event, the front clamping member 24 is preferably fixedly and non-movably coupled to the pedal body 22.

The side portions 32 and 34 extend forward and backward from the tubular shaft supporting portion 23 such that the clamping members 24 and 26 are located at opposite ends thereof. The first side portion 32 has a threaded through bore 40 (at the rear end 38 of pedal body 22) for receiving the support pin 28 therein. The threaded bore 40 aids in providing an attractive appearance, since the end or head of the pivot pin 28 is not visible from the outside of the pedal body 22. The second (outer) side portion 34 is provided with an unthreaded blind bore 44 aligned with the threaded bore 40 for receiving the outer end of the pivot pin 28. The bores 40 and 44 are configured to secure the pivot pin 28 therein in an aesthetic and reliable manner. Thus, a smooth outer surface can be formed.

As mentioned above, the front clamping member 24 is preferably integrally formed with the pedal body 22. Thus, the front clamping member 24 is preferably formed of lightweight rigid metallic material such as aluminum alloy. The front clamping member 24 basically includes a front cleat engagement surface 50 and a front pedal control surface 52, as seen in FIGS. 10, 12, 14 and 16. The front cleat engagement surface 50 is a substantially C-shaped flat surface that faces in a downward (first) direction when the pedal 12 is in the normal riding position. The front cleat engagement surface 50 lies in a first plane $P_1$. The front pedal control surface 52 is a transverse surface extending upwardly from the rear edge of the front cleat engagement surface 50.

More specifically, the front pedal control surface 52 is preferably arranged substantially perpendicular to the front cleat engagement surface 50. The front pedal control surface 52 is formed of a concave curved surface with a radius of curvature of preferably about 28 millimeters. The front clamping member 24 also preferably includes a curved front abutment surface 54 extending downwardly from the front cleat engagement surface 50. The abutment surface 54 is substantially perpendicular to the front cleat engagement surface 50. The abutment surface 54 has a concave curved center section that connects with a pair of flat end surfaces 56 and 58 of the side portions 32 and 34, respectively. These end surfaces 56 and 58 form stop surfaces that limit pivotal and lateral movements of the cleat 14 about the rear floating pivot axis FP. In other words, the cleat 14 normally floats (pivots and shifts laterally) relative to the pedal 12 until portions of the cleat 14 contact portions of the end surfaces 56 and 58 of the side portions 32 and 34.

Referring to FIGS. 12 and 21–29, the rear clamping member 26 has a roughly U-shaped configuration, with its two ends being pivotally supported by the support or pivot pin 28 that passes between the side portions 32 and 34 of the pedal body 22. The rear clamping member 26 basically includes a rear clamping portion 60, a pair of mounting flanges 62 and a base portion 64. The mounting flanges 62 form a mounting portion of the rear clamping member 26. The mounting flanges 62 extend from the rear clamping portion 60 and the base portion 64 to mount the rear clamping member 26 on the support pin 28. Specifically, each mounting flange 62 has a through bore 62a formed therein for receiving the support pin 28. The base portion 64 has a centrally located stepped bore 64a and a rectangular slot 64b. The stepped bore 64a and the rectangular slot 64b support parts of a tension adjustment mechanism 48 between the pedal body 22 and the rear clamping member 26. Specifically, the stepped bore 64a has non-smooth indexing surface configured to mate with a surface of the tension adjustment mechanism 48, as discussed below in more detail. The mounting portion 62 is arranged between the rear clamping portion 60 and the base portion 64.

The rear clamping portion 60 of the rear clamping member 26 basically includes a rear cleat engagement surface 70 and a rear pedal control surface 72. The rear cleat engagement surface 70 is a flat surface that faces in the same direction (i.e. the first downward direction) as the front cleat engagement surface 50. The rear cleat engagement surface 70 lies in a second plane $P_2$ that is offset from the first plane $P_1$. More specifically, the second plane $P_2$ is preferably located above the first plane $P_1$ when the pedal 12 is in the normal riding position. Preferably, the front and rear cleat engagement surfaces 50 and 70 are parallel to each other. The rear pedal control surface 72 is a transverse surface extending upwardly from the rear cleat engagement surface 70. The rear pedal control surface 72 is preferably substantially perpendicular to the rear cleat engagement surface 70. The rear clamping portion 60 also preferably has an inclined guide surface 74 extending upwardly away from the transverse rear pedal control surface 72 to aid in the attachment of the cleat 14 to the pedal 12.

Figure 23:
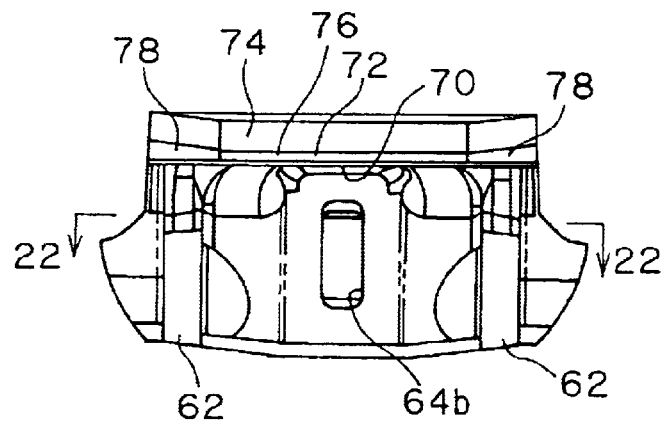
FIG. 23 is a front side elevational view of the rear clamping member illustrated in FIGS. 21 and 22.
Figure 24:
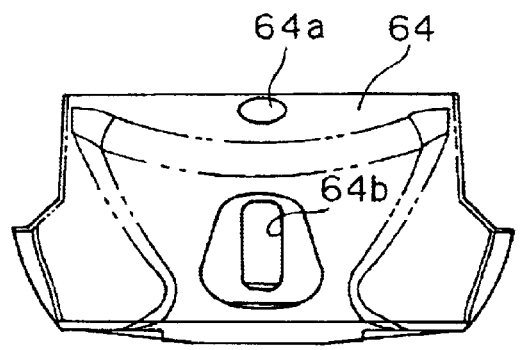
FIG. 24 is a rear side elevational view of the rear clamping member illustrated in FIGS. 21–23.
Figure 25:
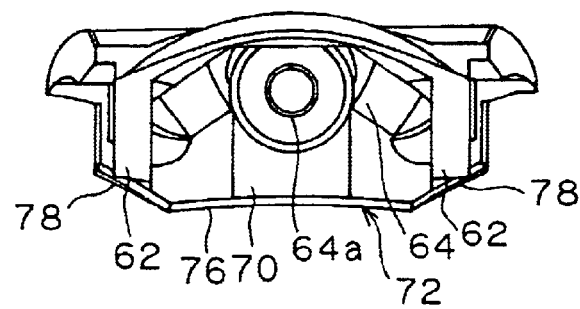
FIG. 25 is a bottom oblique view of the rear clamping member illustrated in FIGS. 21–24.
Figure 26:
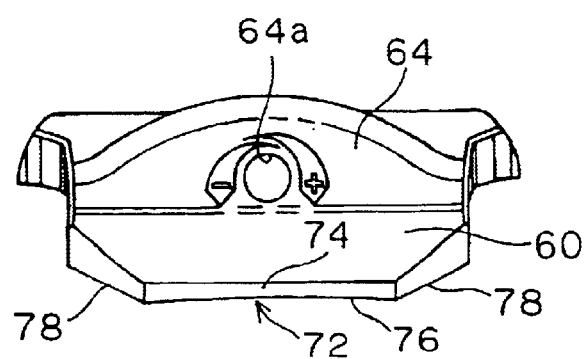
FIG. 26 is a top oblique view of the rear clamping member illustrated in FIGS. 21–25.
Figure 27:
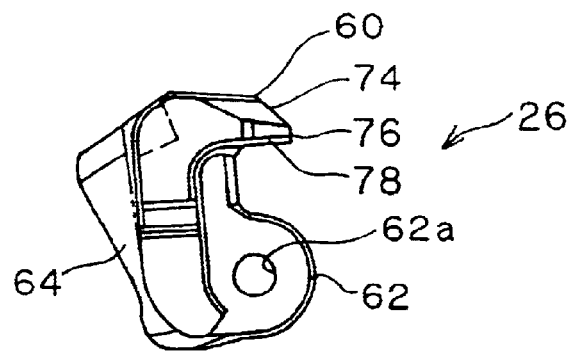
FIG. 27 is an outside elevational view of the rear clamping member illustrated in FIGS. 21–26.
Figure 28:
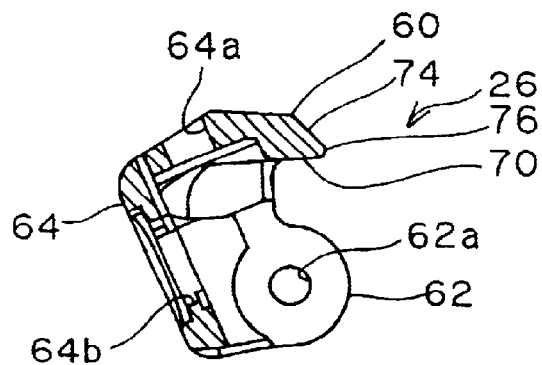
FIG. 28 is a cross-sectional view of the rear clamping member illustrated in FIGS. 21–27 as seen along section line 28—28 of FIG. 21.
Figure 29:
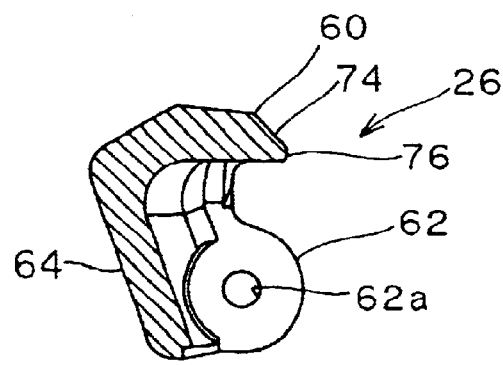
FIG. 29 is a cross-sectional view of the rear clamping member illustrated in FIGS. 21–28 as seen along section line 29—29 of FIG. 21.
Figure 30:
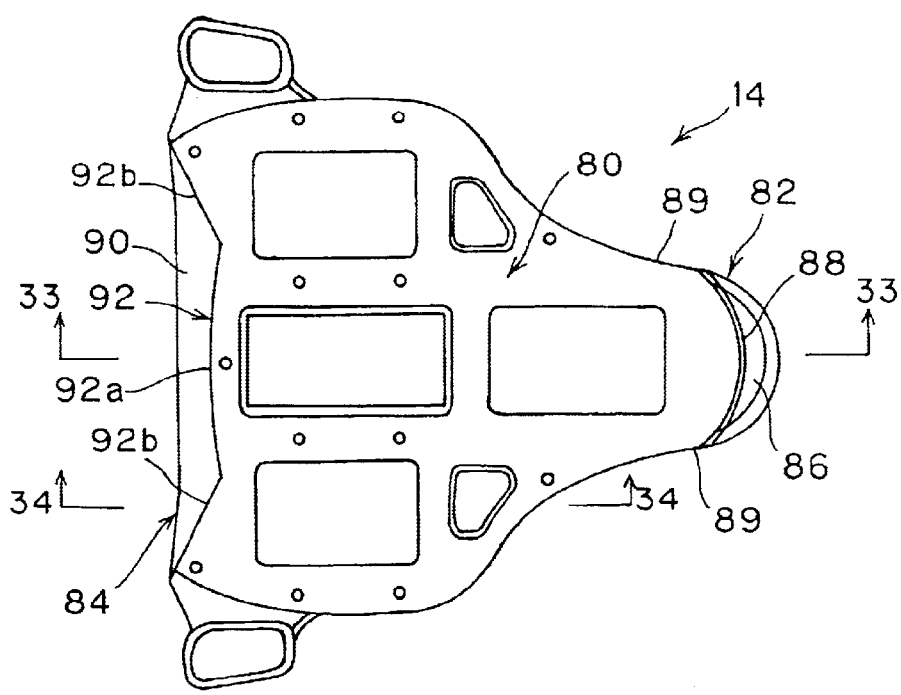
FIG. 30 is a top plan view of the first cleat of the bicycle pedal assembly illustrated in FIGS. 1–8.
Figure 31:
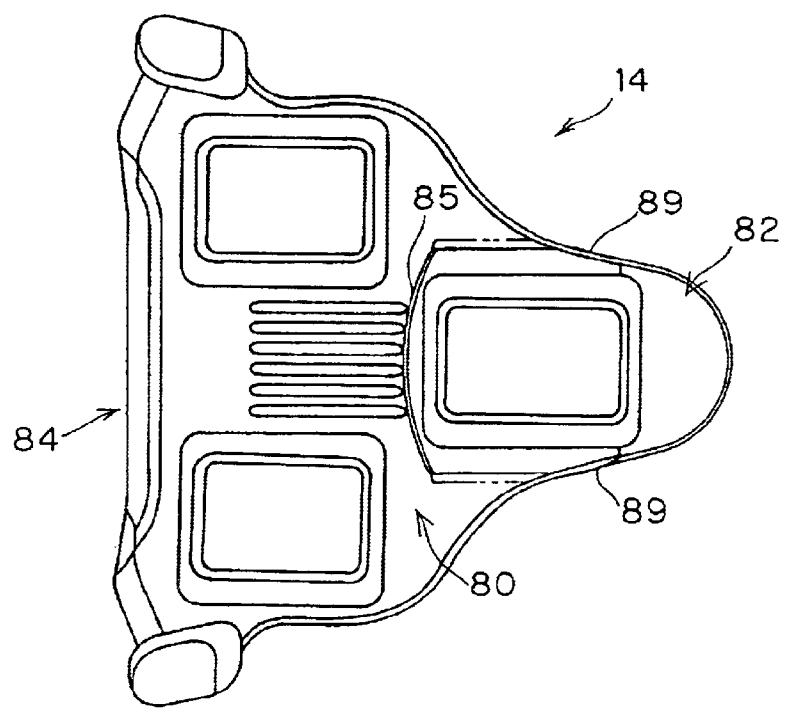
FIG. 31 is a bottom plan view of the first cleat illustrated in FIG. 30.
Figure 32:
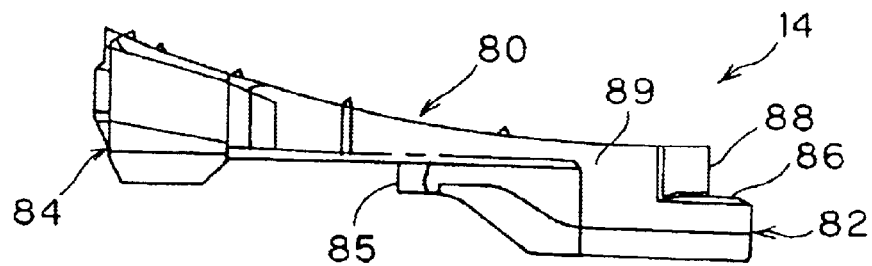
FIG. 32 is a side elevational of the first cleat illustrated in FIGS. 30 and 31.
Figure 33:
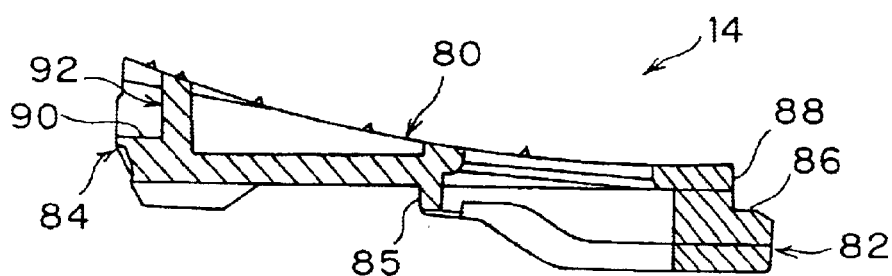
FIG. 33 is a cross-sectional view of the first cleat illustrated in FIGS. 30–32 as seen along line 33—33 of FIG. 30.
Figure 34:
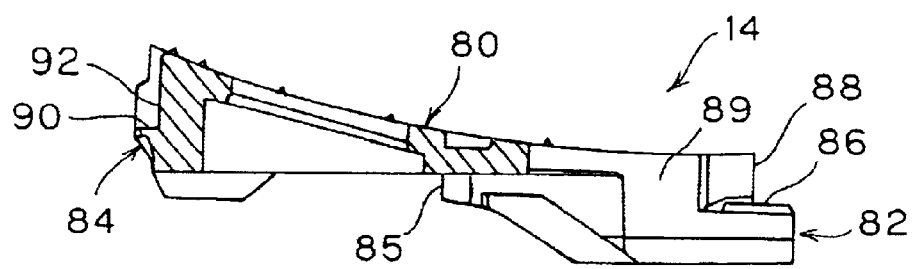
FIG. 34 is a cross-sectional view of the first cleat illustrated in FIGS. 30–33, as seen along section line 34—34 of FIG. 30.
Figure 35:
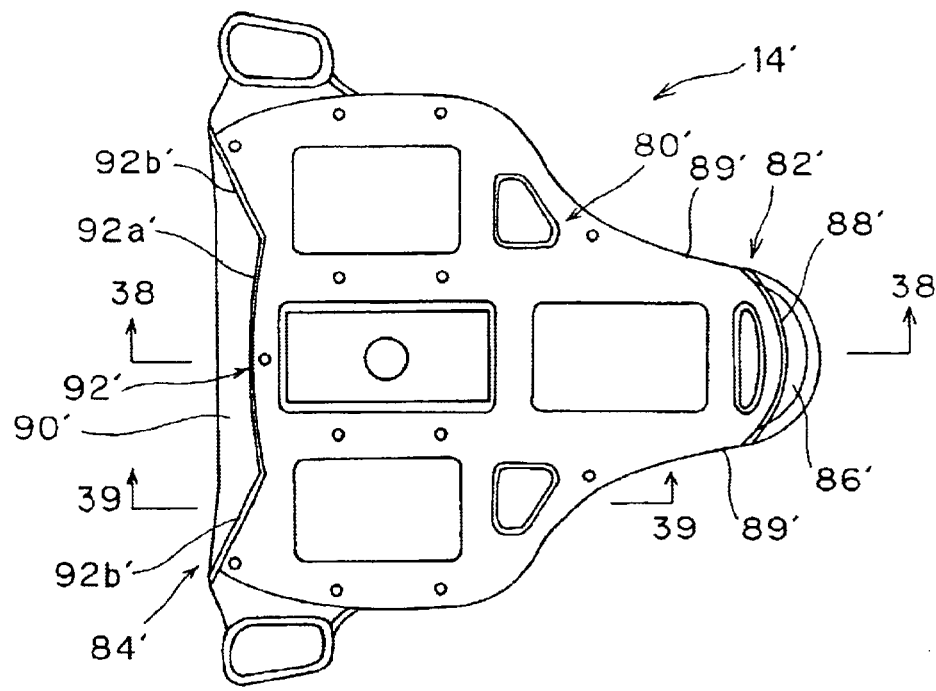
FIG. 35 is a top plan view of a second cleat for use with the bicycle pedal illustrated in FIGS. 1–7 and 9–12.
Figure 36:
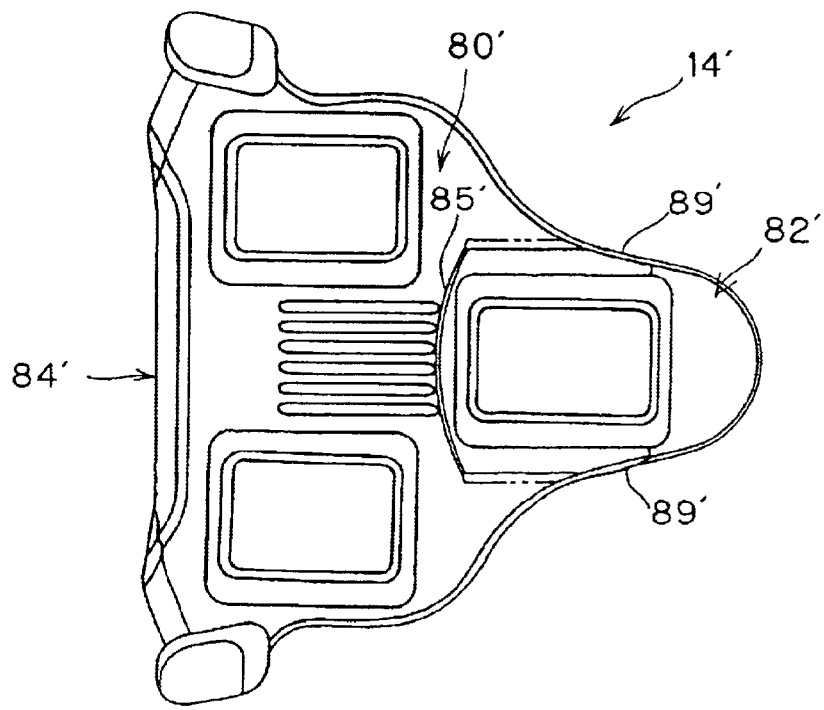
FIG. 36 is a bottom plan view of the second cleat illustrated in FIG. 35.
Figure 37:
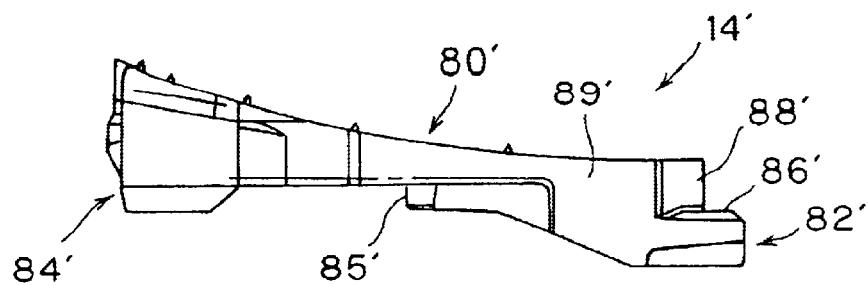
FIG. 37 is a side elevational of the second cleat illustrated in FIGS. 35 and 36.
Figure 38:
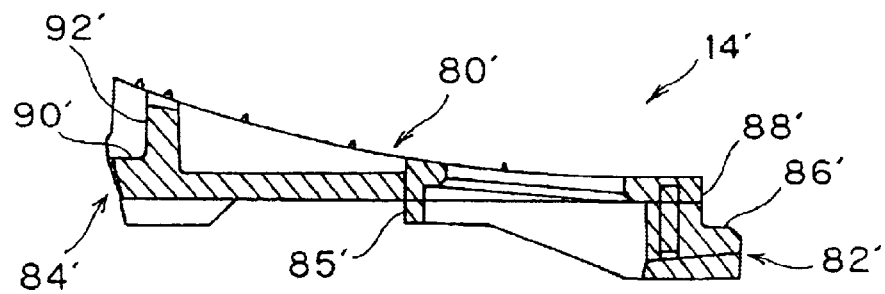
FIG. 38 is a cross-sectional view of the second cleat illustrated in FIGS. 35–37 as seen along line 38—38 of FIG. 35.
Figure 39:
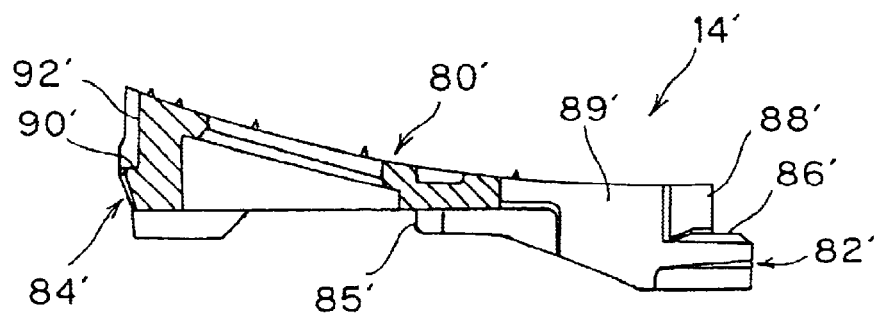
FIG. 39 is a cross-sectional view of the second cleat illustrated in FIGS. 35–38, as seen along section line 39—39 of FIG. 35.

As best seen in FIG. 23, the rear pedal control surface 72 basically includes a rear pedal pivot surface 76 and a pair of side stop surfaces 78. The rear pedal pivot surface 76 is preferably a continuous curved surface, which is concave and connects with the side stop surfaces 78. The side stop surfaces 78 are angled relative to each other to provide space for the floating movements of the cleat 14 or 14'. The rear pedal pivot surface 76 forms an effective curvature that cooperates with the cleat 14 or 14' to form the rear floating pivot axis FP or the center floating pivot axis FP'. More specifically, the rear pedal pivot surface 76 has an effective curvature of about 176.0 millimeters, which cooperates with a surface of the cleat 14 or 14' such that the cleat 14 or 14' floats about the rear floating pivot axis FP as best seen in FIGS. 1–3 or the center floating pivot axis FP' as best seen in FIGS. 5–7.

The side stop surfaces 78 also aid in the disengagement of the cleat 14 or 14' from the pedal 12. More specifically, when the cleat 14 or 14' floats or rotates a predetermined amount, one of the side stop surfaces 78 acts as an inclined plane to rotate the rear clamping member 26 against the biasing force of the springs 29 to release the cleat 14 from the pedal 12. One of the side surfaces 78 then acts as slide surface such that the cleat 14 or 14' can be completely released from the pedal 12.

The torsion springs 29 have their mounting or coiled portions mounted on support pin 28, with one end of each spring engaging a part of pedal body 22 and the other end of each spring 29 engaging a tension adjustment mechanism 48 (indirectly engaging the rear clamping member 26). The springs 29 normally urge the clamping member 26 to rotate about the pivot pin 28 from a cleat releasing position to a cleat engaging or clamping position. In other words, the springs 29 normally maintain the clamping member 26 in cleat engaging position. The retaining forces of the springs 29 on the clamping member 26 are mainly controlled by changing the springs 29 with either weaker or stronger springs. Of course, the shape and the construction of the clamping member 26 can be modified to change the cleat retaining force if needed and/or desired. Thus, the clamping member 26 and/or the springs 29 can be easily exchanged to control the cleat retaining force of the pedal 12 or to replace a damaged part.

The cleat stop surface 23b is preferably disposed between the first plane $P_1$ and the second plane $P_2$. Moreover, the cleat stop surface 23b preferably extends perpendicularly between the first and second planes $P_1$ and $P_2$. Preferably the cleat stop surface 23b is located between the center rotation axis C and the front cleat engagement surface 50.

Figure 12:
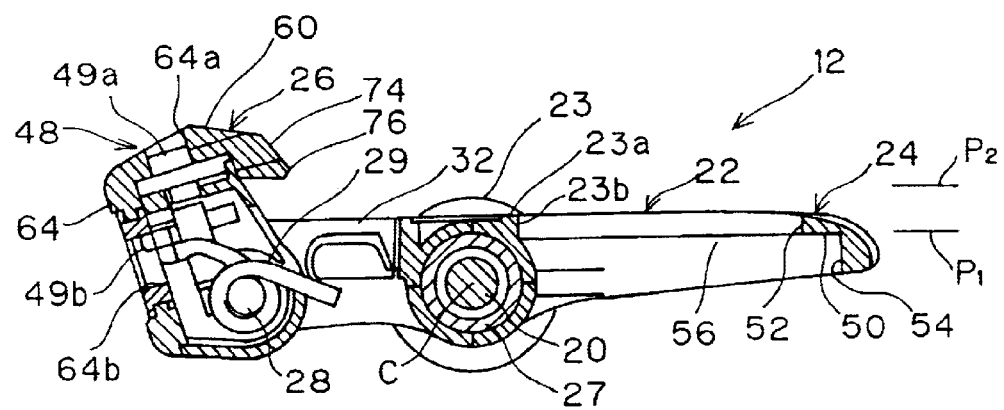
FIG. 12 is a longitudinal cross-sectional view of the bicycle pedal illustrated in FIGS. 9–11 as seen along section line 12—12 of FIG. 9.
Figure 13:
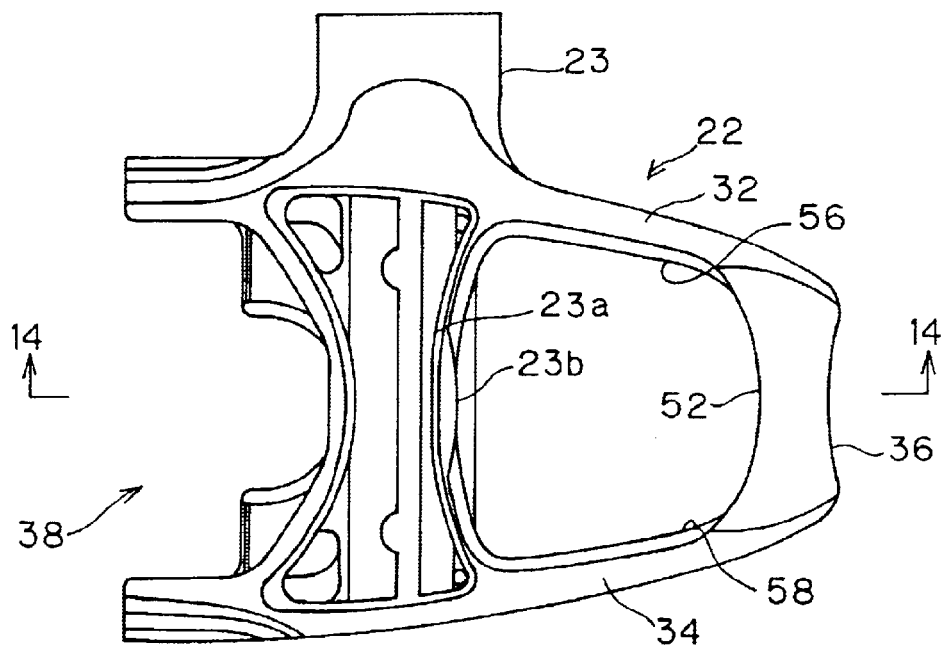
FIG. 13 is a top plan view of the pedal body of the pedal illustrated in FIGS. 1–7 and 9–12.
Figure 14:
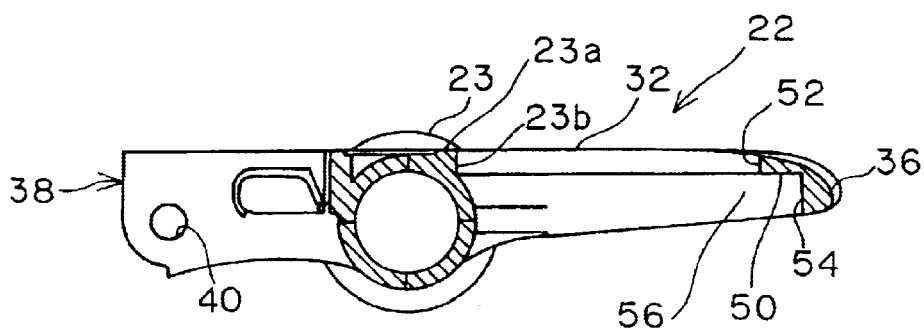
FIG. 14 is a cross-sectional view of the pedal body illustrated in FIG. 10 as seen along section line 14—14 of FIG. 13.
Figure 15:
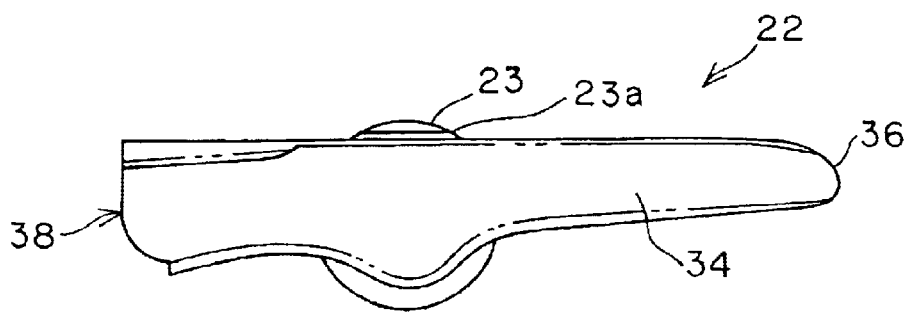
FIG. 15 is an outside elevational view of the pedal body illustrated in FIGS. 13 and 14.
Figure 16:
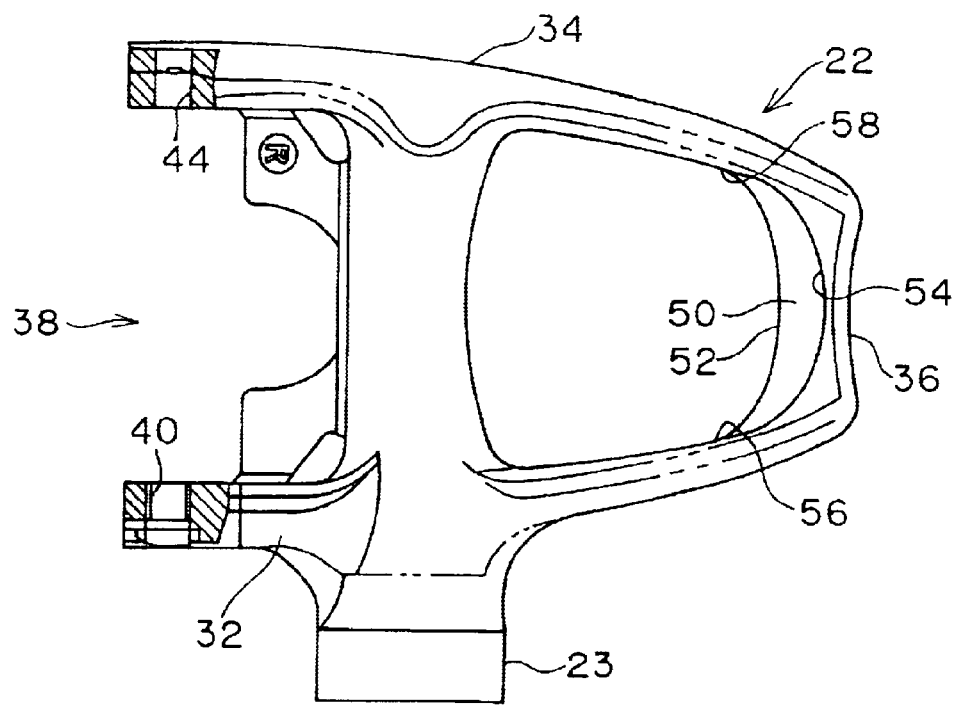
FIG. 16 is a bottom plan view of the pedal body of the pedal illustrated in FIGS. 13–15 with the portions broken away for purpose of illustration.
Figure 17:
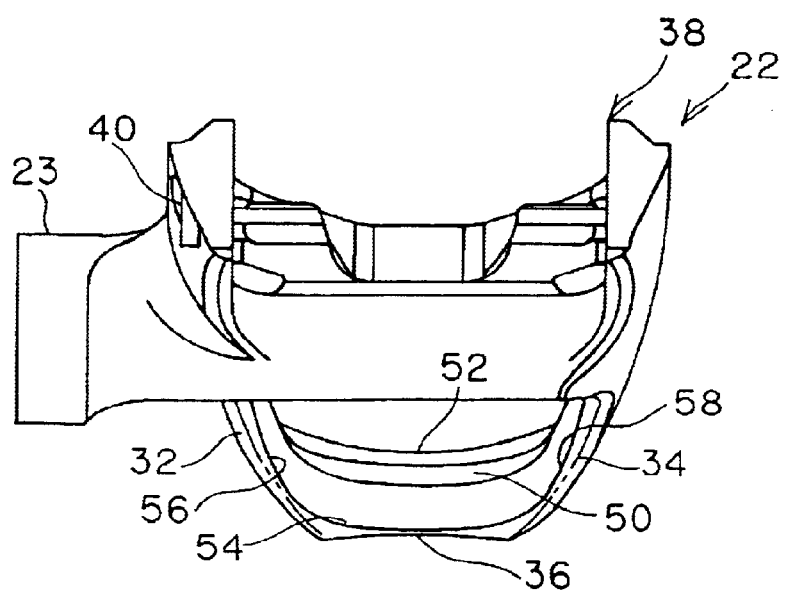
FIG. 17 is a bottom perspective view of the pedal body of the pedal illustrated in FIGS. 13–16.
Figure 18:
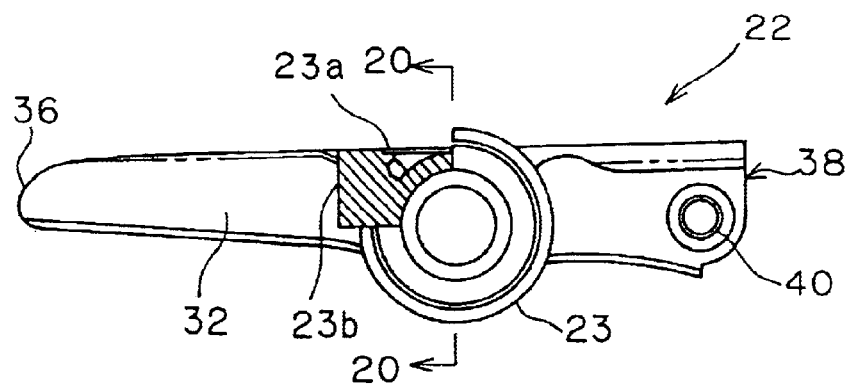
FIG. 18 is an inside elevational view of the pedal body illustrated in FIGS. 13–17 with the portions broken away for purpose of illustration.
Figure 19:
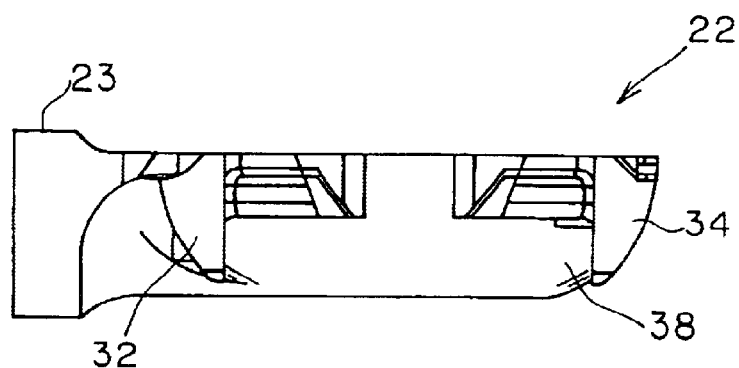
FIG. 19 is a rear end elevational view of the pedal body illustrated in FIGS. 13–18.
Figure 20:
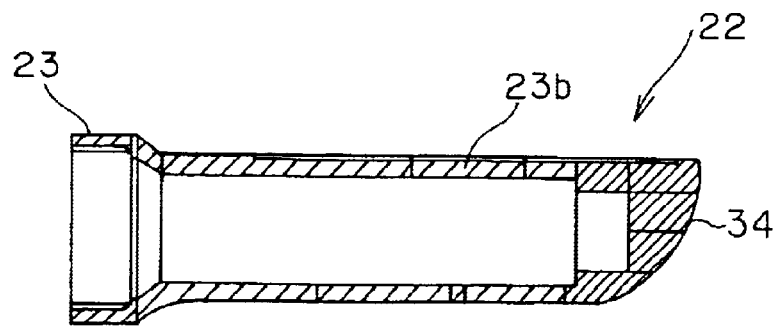
FIG. 20 is a transverse cross-sectional view of the pedal body illustrated FIGS. 13–19 as seen along section line 20—20 of FIG. 18.
Figure 21:
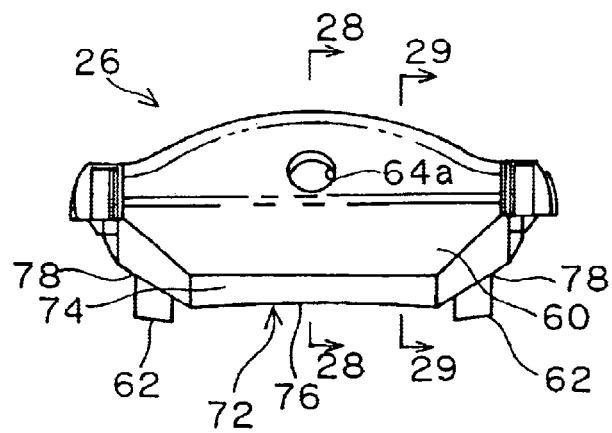
FIG. 21 is a top plan view of the rear clamping member of the bicycle pedal illustrated in FIGS. 9–12.
Figure 22:
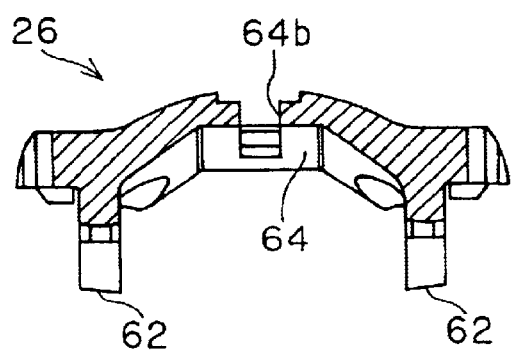
FIG. 22 is a cross-sectional view of the rear clamping member illustrated in FIG. 21 as seen along section line 22—22 of FIG. 23.

As best seen in FIGS. 4 and 12, the tension adjustment mechanism 48 is mounted between the rear clamping member 26 and the springs 29 to adjust the biasing force of the springs 29 applied to the rear clamping member 26. The adjustment mechanism 48 basically includes an adjustment bolt 49a and an adjustment plate 49b. The adjustment bolt 49a is threaded into a threaded hole formed in the adjustment plate 49b. The head of the adjustment bolt 49a has a non smooth indexing surface designed to mate with a surface of the rear clamping member 26 (i.e. the non-smooth indexing surface of the stepped bore 64a ). Thus, the adjustment bolt 49a does not become loose due to vibrations and/or wear. The adjustment plate 49b is a T-shaped plate that has a base portion located in the slot 64b of the rear clamping member 26 to prevent rotation of the adjustment plate 49b. The adjustment bolt 49a and the adjustment plate 49b contacts the rear clamping member 26 such that the biasing force of the springs 29 is transferred to the rear clamping member 26. The associated springs 29 are now adjustably placed under tension. This arrangement allows for easy assembly of the bicycle pedal 12. The tension adjustment mechanism 48 is relatively conventional, and thus, will not be discussed and/or illustrated in detail herein.

A cleat receiving area is formed on one side of the pedal body 22 for receiving and supporting the cleat 14 thereon. More specifically, the cleat receiving area is defined by the space located between the front and rear clamping members 24 and 26 in which the cleat 14 is received. The front and rear clamping members 24 and 26 engage the cleat 14 to releasably couple the sole of the shoe 16 to the bicycle pedal 12. Specifically, the cleat 14 is engaged with the pedal 12 by pressing the cleat 14 into pedal 12 with a forward and downward motion. This releasably locks the cleat 14 to the pedal 12. The cleat 14 can be released from the pedal 12 by twisting the heel of the shoe to the outside of the pedal 12 as discussed below in more detail.

Bicycle Shoe Cleats 14 and 14'

Referring to FIGS. 8 and 30–39, the bicycle shoe cleat 14 and 14' are basically identical, except for their engagement with the rear pedal pivot surface 76 and the stop surfaces 78 of the rear clamping member 26. Thus, the cleat 14 will be discussed in detail and then cleat 14' will be discuss in detail with the parts of the cleat 14' being given the same reference numeral as the parts of the cleat 14, but with a prime (').

The bicycle shoe cleat 14 basically includes a center connecting portion 80, a first or front attachment portion 82 extending from one end of center connecting portion 80 and a second or rear attachment portion 84 extending from the other end of the center connecting portion 80. Preferably, the center connecting portion 80 and the attachment portions 82 and 84 are integrally formed together as a one-piece, unitary member, which is constructed from a suitable rigid material. The center connecting portion 80 has a plurality (three) of holes formed therein for receiving fasteners. Specifically, the cleat 14 is designed for use with three fasteners. The center connecting portion 80 has an upper sole side facing in a first direction for engaging the sole of the shoe 16 and a lower (bottom) pedal side facing in a second direction which is substantially opposite to the first direction. The center connecting portion 80 preferably has a rearwardly facing (second) cleat stop surface 85 disposed on the bottom pedal facing side of the connecting portion 80.

As seen in FIG. 8, the cleat 14 is fixedly attached to the bicycle shoe 16 in a conventional manner via three fasteners. As seen in FIG. 4, the cleat 14 is releasably engaged to the pedal body 22 via the clamping members 24 and 26 in a relatively conventional manner. In other words, the cleat 14 is designed to releasably couple the sole of the shoe 16 to the bicycle pedal 12 by the front and rear clamping members 24 and 26. This type of pedal is often called a step-in or clipless pedal. Specifically, the cleat 14 is engaged with the pedal 12 by pressing the cleat 14 into the pedal 12 with a forward and downward motion. This releasably locks the cleat 14 to the pedal 12. The cleat 14 can be released from pedal 12 by twisting the heel of the shoe to the outside of the pedal 12 as discussed below in more detail. However, the shoe 16 is capable of limited rotation or float about a rear float pivot axis FP prior to disengagement, as also discussed below in more detail.

As seen in FIG. 4, the cleat stop surface 85 is arranged and configured relative to the cleat stop surface 23b of the pedal body 22 such that the cleat stop surface 85 engages the cleat stop surface 23b after a predetermined amount (gap G) of rearward movement of the cleat 14 relative to the pedal body 22 to prevent further relative movement between the cleat 14 and the pedal body 22 when the front and rear clamping members 24 and 26 are engaged with the front and rear attachment portions 82 and 84, respectively. In other words, the cleat stop surfaces 23b and 85 are configured to limit rearward movement of the cleat 14 relative to the pedal body 22 such that the cleat 14 is not inadvertently released from the pedal body 22 due to rearward relative movement of the cleat 14 relative to the pedal body 22. However, there is preferably a small gap G that is normally located between the cleat stop surface 23b and the cleat stop surface 85, when the front and rear clamping members 24 and 26 are engaged with the front and rear attachment portions 82 and 84, respectively. The cleat stop surface 85 of the cleat 14 is normally longitudinally spaced about 0.5 millimeters from the cleat stop surface 23b when the front and rear clamping members 24 and 26 are engaged with the front and rear attachment portions 82 and 84, respectively.

During normal engagement between the pedal 12 and the cleat 14, the cleat 14 cannot move along the longitudinal axis B of the pedal body 22 without rotating the rear clamping member 26 against the biasing force of the springs 29. Accordingly, the cleat stop surfaces 23b and 85 allow for a predetermined amount of rearward movement of the cleat 14 relative to the pedal body 22 that corresponds to the distance defined by the gap G in the direction of the longitudinal axis B. In other words, the cleat stop surfaces 23b and 85 are oppositely curved surfaces that are configured and arranged such that they do not interfere with the normal releasing of the cleat 14 relative to the pedal 12. In other words, the curvature of the cleat stop surfaces 23b and 85 are such that the cleat 14 can freely pivot about the front disengagement pivot axis DP as seen in FIG. 1. When the pedal 12 and the cleat 14 are configured to allow for the rear floating of the cleat 14 on the pedal 12, the cleat stop surfaces 23b and 85 should be configured and arranged so as not to interfere with this floating arrangement. Of course, this aspect of the present invention can be applied to pedals that do not include a rear float pivot axis described herein.

The front attachment portion 82 of the cleat 14 basically includes a front coupling surface 86, a front cleat control surface 88 and a pair of lateral stop surfaces 89. The front coupling surface 86 is selectively engageable with the front engagement surface 50 of the front clamping member 24. The front cleat control surface 88 cooperates with the front pedal control surface 52 to control movement of the cleat 14 relative to the pedal 12. Specifically, the front cleat control surface 88 is a transverse surface extending upwardly from the front coupling surface 86. Preferably, the front cleat control surface 88 extends substantially perpendicular to the front coupling surface 86 and includes a central convex curved surface. The front cleat control surface 88 has a radius of curvature smaller than the radius of curvature of the front pedal control surface 52. Specifically, the radius of curvature of the front cleat control surface 88 is preferably about 14.2 millimeters. Thus, the lateral stop surfaces 89 contact the flat end surfaces 56 and 58 of the side portions 32 and 34 of the pedal body 22. In other words, these end surfaces 56 and 58 and these lateral stop surfaces 89 limit pivotal and lateral movements of the cleat 14 about the rear floating pivot axis FP. In other words, the cleat 14 normally floats (pivots and shifts laterally) relative to the pedal 12 until portions of the cleat 14 contact portions of the end surfaces 56 and 58 of the side portions 32 and 34.

The rear attachment portion 84 of the cleat 14 basically includes a rear coupling surface 90 and a rear cleat control surface 92. The rear coupling surface 90 is selectively engageable with the rear engagement surface 70 of the rear clamping member 26. The rear cleat control surface 92 cooperates with the rear pedal control surface 72 to control movement of the cleat 14 relative to the pedal 12. Specifically, the rear cleat control surface 92 is a transverse surface extending upwardly from the rear coupling surface 90. Preferably, the rear cleat control surface 92 is an inclined surface forming an angle of about ninety degrees with the rear coupling surface 90, and includes a central convex curved surface 92a, a pair of straight side surfaces 92b and a pair of inclined end surfaces 92b.

The shape of the rear cleat control surface 92 corresponds generally in shape to the rear pedal control surface 72. However, the inclined end surfaces 92b are spaced from the side surfaces 78 to allow the cleat 14 to float (pivot) about the pivot axis FP and allow the pivot axis FP to shift laterally. The central concave curved surface 92a has a radius of curvature slightly smaller than the curvature of the rear pedal pivot surface 76 such that the cleat 14 normally pivots or floats about the rear floating pivot axis FP and so that the pivot axis FP can shift laterally. The lengths of the rear pedal pivot surface 76 and the central convex curved surface 92*a* determine the location of the pivot axis FP, and thus, the amount of pivotal movement and lateral movement of the cleat 14 relative to the pedal 12. In the illustrated embodiment, the length of the rear pedal pivot surface 76 is about 27 millimeters, while the length of the central convex curved surface 92*a* is about 27.6 millimeters.

Referring again to FIG. 1, a pedaling force center (located substantially at the intersection of axes B and C) is aligned with the rear float pivot axis FP when the cleat 14 is in a straight (non-floated) orientation. The pedaling force center is the center point of application of the pedaling force of the rider and lies on a forward pedaling force vector. However, the cleat 14 is preferably capable of floating (pivoting) approximately three degrees in either direction (i.e. a total of six degrees) from the straight (non-floated) orientation about the rear float pivot axis FP. In other words, the pedal 12 and the cleat 14 are configured such that the cleat 14 floats around the rear float pivot axis FP for about three degrees in each direction as measured from a center longitudinal axis B that passes through the rear float pivot axis FP. Thus, a desired degree or angle of float can be attained.

Even when the cleat 14 floats or rotates about the rear float pivot axis FP relative to the pedal 12, the pedaling force center remains substantially aligned (or only slightly offset) from the rear float pivot axis FP such that the cleat 14 does not accidentally disengage from the pedal 12 during pedaling. In other words, the forward pedaling force vector F is applied substantially along both the rear float pivot axis FP and the pedaling force center. Thus, effective pedaling power is achieved without disengagement.

The bicycle shoe cleat 14' basically includes a center connecting portion 80', a first or front attachment portion 82' extending from one end of center connecting portion 80' and a second or rear attachment portion 84' extending from the other end of the center connecting portion 80'. Preferably, the center connecting portion 80' and the attachment portions 82' and 84' are integrally formed together as a one-piece, unitary member, which is constructed from a suitable rigid material. The center connecting portion 80' has a plurality (three) of holes formed therein for receiving fasteners. The center connecting portion 80' has an upper sole side facing in a first direction for engaging the sole of the shoe 16 and a lower (bottom) pedal side facing in a second direction which is substantially opposite to the first direction. The center connecting portion 80' preferably has a rearwardly facing (second) cleat stop surface 85' disposed on the bottom pedal facing side of the connecting portion 80'.

The second cleat 14' is releasably engaged to the pedal body 22 via the clamping members 24 and 26 in the same manner as the first cleat 14. In other words, the cleat 14' is designed to releasably couple the sole of the shoe 16 to the bicycle pedal 12 by the front and rear clamping members 24 and 26. However, the shoe 16 is capable of limited lateral movement and pivotal movement or float about the center float pivot axis FP' prior to disengagement, as also discussed below in more detail.

During normal engagement between the pedal 12 and the cleat 14', the cleat 14 cannot move along the longitudinal axis B of the pedal body 22 without rotating the rear clamping member 26 against the biasing force of the springs 29. Accordingly, the cleat stop surfaces 23*b* and 85' allow for a predetermined amount of rearward movement of the cleat 14' relative to the pedal body 22 that corresponds to the distance defined by the gap in the direction of the longitudinal axis B.

The front attachment portion 82' of the cleat 14' basically includes a front coupling surface 86', a front cleat control surface 88' and a pair of lateral stop surfaces 89'. The front coupling surface 86' is selectively engageable with the front engagement surface 50 of the front clamping member 24. The front cleat control surface 88' cooperates with the front pedal control surface 52 to control movement of the cleat 14' relative to the pedal 12. Specifically, the front cleat control surface 88' is a transverse surface extending upwardly from the front coupling surface 86'. Preferably, the front cleat control surface 88' extends substantially perpendicular to the front coupling surface 86' and includes a central convex curved surface. The front cleat control surface 88' has a radius of curvature smaller than the radius of curvature of the front pedal control surface 52. Specifically, the radius of curvature of the front cleat control surface 88' is preferably about 14.2 millimeters. Thus, the lateral stop surfaces 89' contact the flat end surfaces 56 and 58 of the side portions 32 and 34 of the pedal body 22. In other words, these end surfaces 56 and 58 and these lateral stop surfaces 89' limit pivotal and lateral movements of the cleat 14' about the center floating pivot axis FP'. In other words, the cleat 14' normally floats (pivots and shifts laterally) relative to the pedal 12 until portions of the cleat 14' contact portions of the end surfaces 56 and 58 of the side portions 32 and 34.

The rear attachment portion 84' of the cleat 14' basically includes a rear coupling surface 90' and a rear cleat control surface 92'. The rear coupling surface 90' is selectively engageable with the rear engagement surface 70 of the rear clamping member 26. The rear cleat control surface 92' cooperates with the rear pedal control surface 72 to control movement of the cleat 14' relative to the pedal 12. Specifically, the rear cleat control surface 92' is a transverse surface extending upwardly from the rear coupling surface 90'. Preferably, the rear cleat control surface 92' is an inclined surface forming an angle of about ninety degrees with the rear coupling surface 90', and includes a central convex curved surface 92*a*', a pair of straight side surfaces 92*b*' and a pair of inclined end surfaces 92*b*'. The lengths of the rear pedal pivot surface 76 and the central convex curved surface 92*a*' determine the location of the pivot axis FP', and thus, the amount of pivotal movement and lateral movement of the cleat 14' relative to the pedal 12. In the illustrated embodiment, the length of the rear pedal pivot surface 76 is about 27 millimeters, while the length of the central convex curved surface 92*a*' is about 32.0 millimeters.

In cleat 14', the lateral length of the central convex curved surface 92*a*' is larger than in cleat 14. This results in the center floating pivot axis FP' being located substantially at the center axis C. This difference also results in a larger amount of pivotal movement of the cleat 14' about the center floating pivot axis FP', i.e., about five degrees of pivotal movement in either direction (i.e. a total of ten degrees) from the straight (non-floated) orientation about the center float pivot axis FP'. Moreover, this difference also results in a larger amount of lateral shift of the center float pivot axis FP' of the cleat 14', i.e., about four millimeters of lateral movement in either direction (i.e. a total of eight millimeters) from the straight (non-floated) orientation about the center float pivot axis FP'.

The shape of the rear cleat control surface 92' corresponds generally in shape to the rear pedal control surface 72. However, the inclined end surfaces 92*b*' are spaced from the side surfaces 78 to allow the cleat 14' to float (pivot) about the pivot axis FP' and allow the pivot axis FP' to shift laterally. The central concave curved surface 92a' has a radius of curvature slightly smaller than the curvature of the rear pedal pivot surface 76 such that the cleat 14' normally pivots or floats about the center floating pivot axis FP' and so that the pivot axis FP' can shift laterally.

As used herein, the following directional terms "forward, rearward, above, downward, vertical, horizontal, below and transverse" as well as any other similar directional terms refer to those directions of a bicycle equipped with a pedal of the present invention and when the pedal is horizontally oriented relative to the ground. Accordingly, these terms, as utilized to describe the present invention should be interpreted relative to a bicycle equipped with a pedal of the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle pedal assembly comprising:
    a bicycle pedal including
        a pedal shaft having a first end adapted to be coupled to a bicycle crank and a second end with a center rotation axis extending between said first and second ends,
        a pedal body rotatably coupled to said second end of said pedal shaft about said center rotation axis of said pedal shaft, said pedal body having a front end and a rear end longitudinally spaced from said front end,
        a front clamping member coupled to said front end of said pedal body, and
        a rear clamping member movably coupled to said rear end of said pedal body to move rearwardly between a clamping position and a release position; and
    a bicycle shoe cleat configured to selectively engage said pedal body via said front and rear clamping members, said bicycle shoe cleat including
        a front attachment portion configured to selectively engage said front clamping member,
        a rear attachment portion configured to selectively engage said rear clamping member, and
        a connecting portion extending between said front and rear attachment portions,
    said front and rear clamping members and said front and rear attachment portions being configured relative to one another to form a laterally shiftable floating pivot axis that is substantially perpendicular to said center rotation axis when said front and rear clamping members are engaged with said front and rear attachment portions, respectively, such that said bicycle shoe cleat pivots about said floating pivot axis relative to said pedal body through a predetermined ranges of pivotal movements without interfering with said rear clamping member of said bicycle pedal, and said bicycle shoe cleat laterally shifts relative to said pedal body through a predetermined range of lateral movement to laterally shift said floating pivot axis without releasing said bicycle shoe cleat from said bicycle pedal.

2. The bicycle pedal assembly according to claim 1, wherein said predetermined lateral movement range is at least approximately three millimeters.

3. The bicycle pedal assembly according to claim 1, wherein said predetermined pivot movement range is at least approximately six degrees.

4. A bicycle pedal assembly comprising:
    a bicycle pedal including
        a pedal shaft having a first end adapted to be coupled to a bicycle crank and a second end with a center rotation axis extending between said first and second ends
        a pedal body rotatably coupled to said second end of said pedal shaft about said center rotation axis of said pedal shaft, said pedal body having a front end and a rear end longitudinally spaced from said front end,
        a front clamping member coupled to said front end of said pedal body, and
        a rear clamping member movably coupled to said rear end of said pedal body to move rearwardly between a clamping position and a release position; and
    a bicycle shoe cleat configured to selectively engage said pedal body via said front and rear clamping members, said bicycle shoe cleat including
        a front attachment portion configured to selectively engage said front clamping member,
        a rear attachment portion configured to selectively engage said rear clamping member, and
        a connecting portion extending between said front and rear attachment portions,
    said front and rear clamping members and said front and rear attachment portions being configured relative to one another to form a laterally shiftable floating pivot axis that is substantially perpendicular to said center rotation axis when said front and rear clamping members are engaged with said front and rear attachment portions, respectively, such that said bicycle shoe cleat pivots about said floating pivot axis relative to said pedal body through a predetermined range of pivotal movement without releasing said bicycle shoe cleat from said bicycle pedal, and said bicycle shoe cleat laterally shifts relative to said pedal body through a predetermined range of lateral movement to laterally shift said floating pivot axis without releasing said bicycle shoe cleat from said bicycle pedal,
    said floating pivot axis being located adjacent said rear clamping member.

5. The bicycle pedal assembly according to claim 4, wherein
    said predetermined pivot movement range is at least approximately six degrees, and said predetermined lateral movement range is at least approximately three millimeters.

6. The bicycle pedal assembly according to claim 1, wherein said predetermined lateral movement range is at least approximately eight millimeters.

7. The bicycle pedal assembly according to claim 1, wherein said predetermined pivot movement range is at least approximately ten degrees.

8. The bicycle pedal assembly according to claim 1, wherein said floating pivot axis is located adjacent said center rotation axis.

9. The bicycle pedal assembly according to claim 8, wherein said predetermined pivot movement range is at least approximately ten degrees, and said predetermined lateral movement range is at least approximately eight millimeters.

10. A bicycle pedal assembly comprising:

a bicycle pedal including
a pedal shaft having a first end adapted to be coupled to a bicycle crank and a second end with a center rotation axis extending between said first and second ends,
a pedal body rotatably coupled to said second end of said pedal shaft about said center rotation axis of said pedal shaft, said pedal body having a front end and a rear end longitudinally spaced from said front end, said pedal body including a first cleat stop surface located between said center rotation axis and said front end,
a front clamping member coupled to said front end of said pedal body, and
a rear clamping member movably coupled to said rear end of said pedal body to move rearwardly between a clamping position and a release position; and a bicycle shoe cleat configured to selectively engage said pedal body via said front and rear clamping members, said bicycle shoe cleat including
a front attachment portion configured to selectively engage said front clamping member,
a rear attachment portion configured to selectively engage said rear clamping member, and
a connecting portion extending between said front and rear attachment portions, said front and rear clamping members and said front and rear attachment portions being configured relative to one another to form a laterally shiftable floating pivot axis that is substantially perpendicular to said center rotation axis and disposed adjacent one of said rear clamping member and said center rotation axis when said front and rear clamping members are engaged with said front and rear attachment portions, respectively, such that said bicycle shoe cleat pivots about said floating pivot axis relative to said pedal body through a predetermined range of pivotal movement without releasing said bicycle shoe cleat from said bicycle pedal, and said bicycle shoe cleat laterally shifts relative to said pedal body through a predetermined range of lateral movement to laterally shift said floating pivot axis without releasing said bicycle shoe cleat from said bicycle pedal, said connecting portion including a second cleat stop surface arranged and configured relative to said first cleat stop surface to engage said first cleat stop surface after a predetermined amount of rearward movement of said bicycle shoe cleat relative to said pedal body to prevent further relative movement between said bicycle shoe cleat and said pedal body when said front and rear clamping members are engaged with said front and rear attachment portions, respectively.

11. The bicycle pedal assembly according to claim 10, wherein said first and second cleat stop surfaces are convex curved surfaces.

12. The bicycle pedal assembly according to claim 10, wherein said second cleat stop surface is normally longitudinally spaced about five millimeters from said first cleat stop surface when said front and rear clamping members are engaged with said front and rear attachment portions, respectively.

13. The bicycle pedal assembly according to claim 10, wherein said first cleat stop surface is disposed on a forwardly facing portion of a tubular shaft supporting portion, and
said second cleat stop surface is disposed on a bottom surface of said connecting portion.

14. A bicycle pedal assembly comprising:

a bicycle pedal including
a pedal shaft having a first end adapted to be coupled to a bicycle crank and a second end with a center rotation axis extending between said first and second ends,
a pedal body rotatably coupled to said second end of said pedal shaft about said center rotation axis of said pedal shaft, said pedal body having a front end and a rear end longitudinally spaced from said front end,
a front clamping member coupled to said front end of said pedal body, said front clamping member including a downwardly facing front cleat engagement surface disposed in a first plane and a front pedal control surface arranged perpendicular to said front cleat engagement surface, and
a rear clamping member movably coupled to said rear end of said pedal body to move rearwardly between a clamping position and a release position, said rear clamping member including a downwardly facing rear cleat engagement surface disposed in a second plane and a rear pedal control surface arranged perpendicular to said rear cleat engagement surface; and a bicycle shoe cleat configured to selectively engage said pedal body via said front and rear clamping members, said bicycle shoe cleat including
a front attachment portion configured to selectively engage said front clamping member,
a rear attachment portion configured to selectively engage said rear clamping member, and
a connecting portion extending between said front and rear attachment portions, said front and rear clamping members and said front and rear attachment portions being configured relative to one another to form a laterally shiftable floating pivot axis that is substantially perpendicular to said center rotation axis and disposed adjacent one of said rear clamping member and said center rotation axis and adjacent a center longitudinal plane generally bisecting said pedal body when said front and rear clamping members are engaged with said front and rear attachment portions, respectively, and during releasing of said bicycle shoe cleat from said bicycle pedal such that said bicycle shoe cleat pivots about said floating pivot axis relative to said pedal body through a predetermined range of pivotal movement without releasing said bicycle shoe cleat from said bicycle pedal, and said bicycle shoe cleat laterally shifts relative to said pedal body through a predetermined range of lateral movement to laterally shift said floating pivot axis without releasing said bicycle shoe cleat from said bicycle pedal and without lateral shifting of said front and rear clamping members.

15. The bicycle pedal assembly according to claim 14, wherein said first plane of said front cleat engagement surface is offset from said second plane of said rear cleat engagement surface.

16. The bicycle pedal assembly according to claim 15, wherein
said front and rear cleat engagement surfaces are substantially parallel.

17. The bicycle pedal assembly according to claim 15, wherein
said first plane of said front cleat engagement surface is closer to said center rotation axis than said second plane of said rear cleat engagement surface as measured in a direction perpendicular to said first and second planes.

18. The bicycle pedal assembly according to claim 15, wherein
said pedal body includes a first cleat stop surface disposed between said first and second planes.

19. The bicycle pedal assembly according to claim 1, wherein
said front clamping member is non-movably coupled to said pedal body.

20. A bicycle pedal assembly comprising:
a bicycle pedal including
a pedal shaft having a first end adapted to be coupled to a bicycle crank and a second end with a center rotation axis extending between said first and second ends,
a pedal body rotatably coupled to said second end of said pedal shaft about said center rotation axis of said pedal shaft, said pedal body having a front end and a rear end longitudinally spaced from said front end,
a front clamping member non-movably coupled to said front end of said pedal body, and
a rear clamping member movably coupled to said rear end of said pedal body to move rearwardly between a clamping position and a release position, said rear clamping member being normally biased toward said clamping position by a biasing member arranged between said pedal body and said rear clamping member; and
a bicycle shoe cleat configured to selectively engage said pedal body via said front and rear clamping members, said bicycle shoe cleat including
a front attachment portion configured to selectively engage said front clamping member,
a rear attachment portion configured to selectively engage said rear clamping member, and
a connecting portion extending between said front and rear attachment portions.
said front and rear clamping members and said front and rear attachment portions being configured relative to one another to form a laterally shiftable floating pivot axis that is substantially perpendicular to said center rotation axis and disposed adjacent one of said rear clamping member and said center rotation axis when said front and rear clamping members are engaged with said front and rear attachment portions, respectively, such that said bicycle shoe cleat pivots about said floating pivot axis relative to said pedal body through a predetermined range of pivotal movement without releasing said bicycle shoe cleat from said bicycle pedal, and said bicycle shoe cleat laterally shifts relative to said pedal body through a predetermined range of lateral movement to laterally shift said floating pivot axis without releasing said bicycle shoe cleat from said bicycle pedal.

21. The bicycle pedal assembly according to claim 1, wherein
said front and rear clamping members and said front and rear attachment portions are configured relative to one another such that said floating pivot axis is maintained near a center longitudinal plane generally bisecting said pedal body when said front and rear clamping members are engaged with said front and rear attachment portions, respectively, and during a pivoting releasing movement of said bicycle shoe cleat about said floating pivot axis.

* * * * *